(12) United States Patent
Iwasaki

(10) Patent No.: US 11,755,259 B2
(45) Date of Patent: Sep. 12, 2023

(54) INFORMATION PROCESSING APPARATUS HAVING PREDETERMINED SCREEN DISPLAY, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Yukiyasu Iwasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/567,266

(22) Filed: Jan. 3, 2022

(65) Prior Publication Data
US 2022/0229609 A1 Jul. 21, 2022

(30) Foreign Application Priority Data

Jan. 19, 2021 (JP) ................................. 2021-006286

(51) Int. Cl.
*G06F 3/12* (2006.01)
*G06K 15/02* (2006.01)
*H04N 1/00* (2006.01)

(52) U.S. Cl.
CPC .......... *G06F 3/1205* (2013.01); *G06F 3/1204* (2013.01); *G06F 3/1253* (2013.01); *G06K 15/181* (2013.01); *G06K 15/1805* (2013.01); *H04N 1/00413* (2013.01)

(58) Field of Classification Search
None
See application file for complete search history.

(56) References Cited

U.S. PATENT DOCUMENTS

| | | | |
|---|---|---|---|
| 8,922,795 B2 | 12/2014 | Miller et al. | |
| 2003/0214684 A1* | 11/2003 | Kuboki | H04N 1/32358 358/474 |
| 2020/0174715 A1* | 6/2020 | Kohata | G06F 3/1231 |

FOREIGN PATENT DOCUMENTS

WO 2013/1165704 A1 8/2013

OTHER PUBLICATIONS

Yukiyasu Iwasaki, U.S. Appl. No. 17/567,266, filed Jan. 3, 2022.

* cited by examiner

*Primary Examiner* — Andrew H Lam
(74) *Attorney, Agent, or Firm* — VENABLE LLP

(57) ABSTRACT

An information processing apparatus includes printing control software capable of generating print data of a first format and is capable of communicating with a printing apparatus. The information processing apparatus obtains print data of a second format containing print setting information from OS-standard printing software which runs in the information processing apparatus, the second format being different from the first format, obtains a settable list, and displays a predetermined screen in a case where print setting information contained in the print data meets a predetermined condition. A screen containing information on usage is displayed as the predetermined screen where the predetermined condition is that a particular print setting is contained in the print setting information and information as an indication to display the predetermined screen is displayed in an item in the settable list corresponding to the particular print setting and the predetermined condition is met.

15 Claims, 20 Drawing Sheets

INFORMATION PROCESSING APPARATUS HAVING PREDETERMINED SCREEN DISPLAY, METHOD OF CONTROLLING INFORMATION PROCESSING APPARATUS, AND STORAGE MEDIUM

BACKGROUND

Field

The present disclosure relates to a technique for performing printing.

Description of the Related Art

There has heretofore been a technique which does not require printer-specific software provided by a printer vender (specific printer driver) and has an operating system (OS) provide a standard printing function (OS-standard printing function) (International Publication No. WO2013/116704).

However, printing using the OS-standard printing function cannot take individual printers' specifications into account. For this reason, guide dialogues corresponding to print settings configured by a user are not displayed, which may cause inconvenience.

SUMMARY

An information processing apparatus according to an aspect of the present disclosure is an information processing apparatus having printing control software capable of generating print data of a first format, and being capable of communicating with a printing apparatus, the information processing apparatus including: a first obtaining unit configured to obtain print data of a second format containing print setting information from OS-standard printing software which runs in the information processing apparatus, the second format being different from the first format; and a display control unit configured to display a predetermined screen in a case where the print setting information contained in the print data meets a predetermined condition.

Further features of the present disclosure will become apparent from the following description of exemplary embodiments with reference to the attached drawings.

DESCRIPTION OF THE EMBODIMENTS

Preferred embodiments of the present disclosure will be specifically described with reference to the accompanying drawings. Note that the following embodiments do not limit the present disclosure according to the claims, and not all the combinations of the features described in the embodiments are necessarily essential to the solving means of the present disclosure.

Embodiment 1

Printers not compatible with (not supporting) an OS-standard printing function cannot use the OS-standard printing function. Specifically, printers not compatible with an OS-standard printing function cannot interpret print data of a predetermined format designated for the OS-standard printing function (hereinafter also referred to as "standard format"). Thus, in the present embodiment, printing control software is used which is called a print conversion utility for making a printer without an OS-standard printing function appear as a printer compatible with the OS-standard printing function and enabling the printer to process a print instruction using the OS-standard printing function. The print conversion utility is installed and used in a personal computer (PC) in which an OS is installed. Note that the print conversion utility may be included in a computer other than the PC in which the OS is installed.

In response to a query for ability information from the OS, the print conversion utility replies the ability of the printer not compatible with the OS-standard printing function by proxy. Moreover, the print conversion utility converts print data (command) of the standard format (print data of a second format) into print data (command) of a format supported by the printer (e.g., a format specific to the printer vender) (print data of a first format) and sends it. With the print conversion utility incorporated in the PC, the print conversion utility converts an interaction (communication) with the printer based on a protocol specific to the printer into an interaction based on the OS-standard printing function. Thus, by using the OS-standard printing function, the PC can cause a printer not compatible with the OS-standard printing function to process a print instruction. Note that in a case where a printer-specific driver is installed in the PC instead of a vender driver 107 in FIG. 1B to be mentioned later, a printer not compatible with the OS-standard printing function can also interpret print data as long as it is generated by the specific printer driver. Thus, in a case where the user issues a print instruction via a print execution user interface provided by the specific printer driver, the printing can be done without using the OS-standard printing function.

Figure 1A:
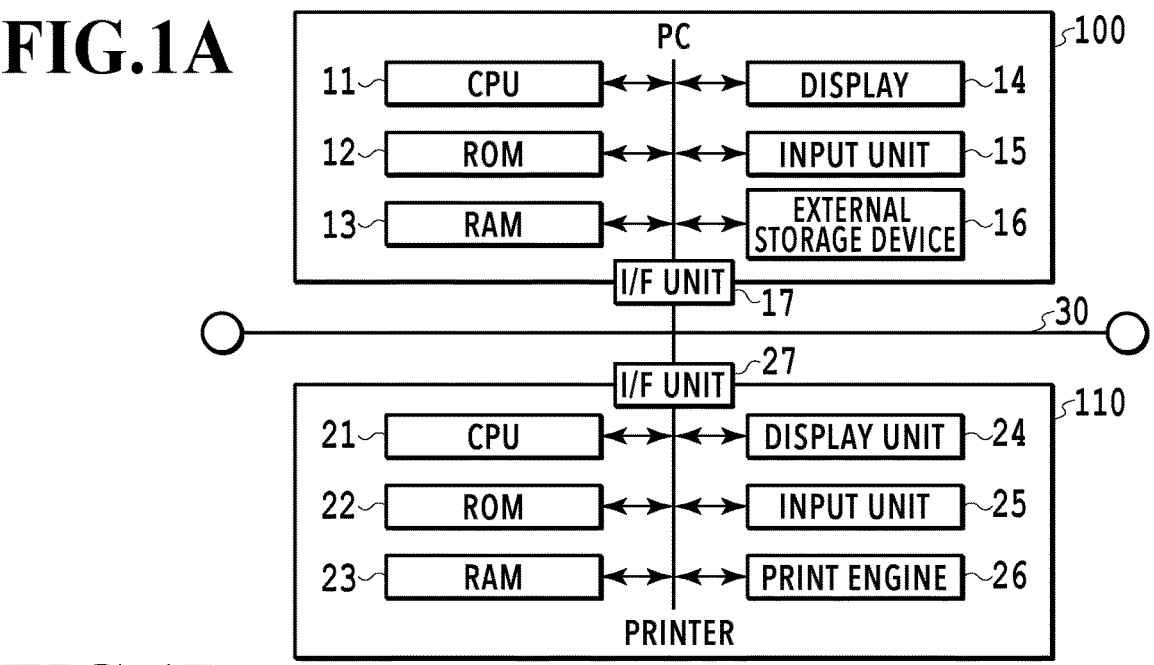
FIGS. 1A and 1B are diagrams each illustrating an entire configuration of a printing system.

FIG. 1A is a block diagram illustrating a hardware configuration of a printing system according to the present embodiment. An entire configuration of the printing system in the present embodiment will be described using FIGS. 1A and 1B. FIG. 1A is a diagram illustrating a hardware configuration of a PC 100 and a printer 110. In the present embodiment, an example of a printing system will be shown in which the PC 100 serving as a host computer and the printer 110 can communicate with each other via a communication bus 30 (network), such as a local area network (LAN). In this example, the network is assumed to be a LAN but may be a wide area network (WAN). Moreover, the form of the network connection is not limited to wired or wireless, and a combination of these may be employed. Furthermore, a universal serial bus (USB) may be employed as the form of connection between the PC 100 and the printer 110. Note that only one printer is illustrated in FIG. 1A but any number of printers can be connected via the communication bus 30. Also, the printer 110 is illustrated in FIG. 1A as an example, and other printers (printers 130 and 140) have a similar configuration as well.

The PC 100 is an example of an information processing apparatus. An OS is installed in the PC 100. The OS includes an OS printing system 102 being OS-standard printing software to be described later.

The PC 100 has an interface (I/F) unit 17, a CPU 11, a ROM 12, a RAM 13, a display 14, an input unit 15, and an external storage device 16. The PC 100 in the present embodiment is not limited to a desktop PC and may be a portable terminal, such as a laptop PC, a tablet PC, or a smartphone.

The PC 100 sends instructions for controlling the printer 110, print data, setting commands, and the like to the printer 110. The CPU 11 is a central processing unit that controls elements in the PC 100, and executes control programs, such as the OS. The ROM 12 controls the system operation of the OS stored therein with the OS. The RAM 13 is a random access memory in which a work area for the CPU 11 is loaded. The external storage device 16 stores various control programs, such as applications.

The input unit 15 is a set of input devices for operating the PC 100, such as a keyboard and a mouse. The display 14 is a display device for the presentation of a display for checking information input from the input unit 15, the displaying of user interface screens of the OS and applications, the displaying of screens for notification of messages and the like, and so on. The I/F unit 17 is a communication module that sends and receives data to and from the printer 110.

The printer 110 as a printing apparatus is an inkjet printer, for example. The printer 110 has an I/F unit 27, a CPU 21, a ROM 22, a RAM 23, a display unit 24, an input unit 25, and a print engine 26. The CPU 21 is a central processing unit that controls the following elements. The ROM 22 is a read-only memory and stores a program that controls the print engine 26. The RAM 23 is a dynamic random access memory, and temporarily stores a program necessary for the operation of the print engine 26, setting values received from the PC 100, and so on. The input unit 25 is a set of buttons and the like for operating the printer 110. The display unit 24 is a display device for the presentation of a display for checking information input from the input unit 25, the displaying of a message on the status of the printer 110, and so on.

The print engine 26 performs printing on a print medium based on print data sent from the PC 100. The I/F unit 27 is a communication module that receives print data from the PC 100, and has a function of sending information on the current status of the printer 110 from the printer 110 to the PC 100, and the like. The status information mentioned here is status data which indicates the state of the printer 110 and which the printer 110 can return in response to a request from the PC 100 connected thereto via the I/F unit 27. The status data is information for notification of an operation state of the printer 110 such as "printing" or "standby" and an error state of the printer 110 such as "out of paper", "cover is open", or "out of ink".

Figure 1B:
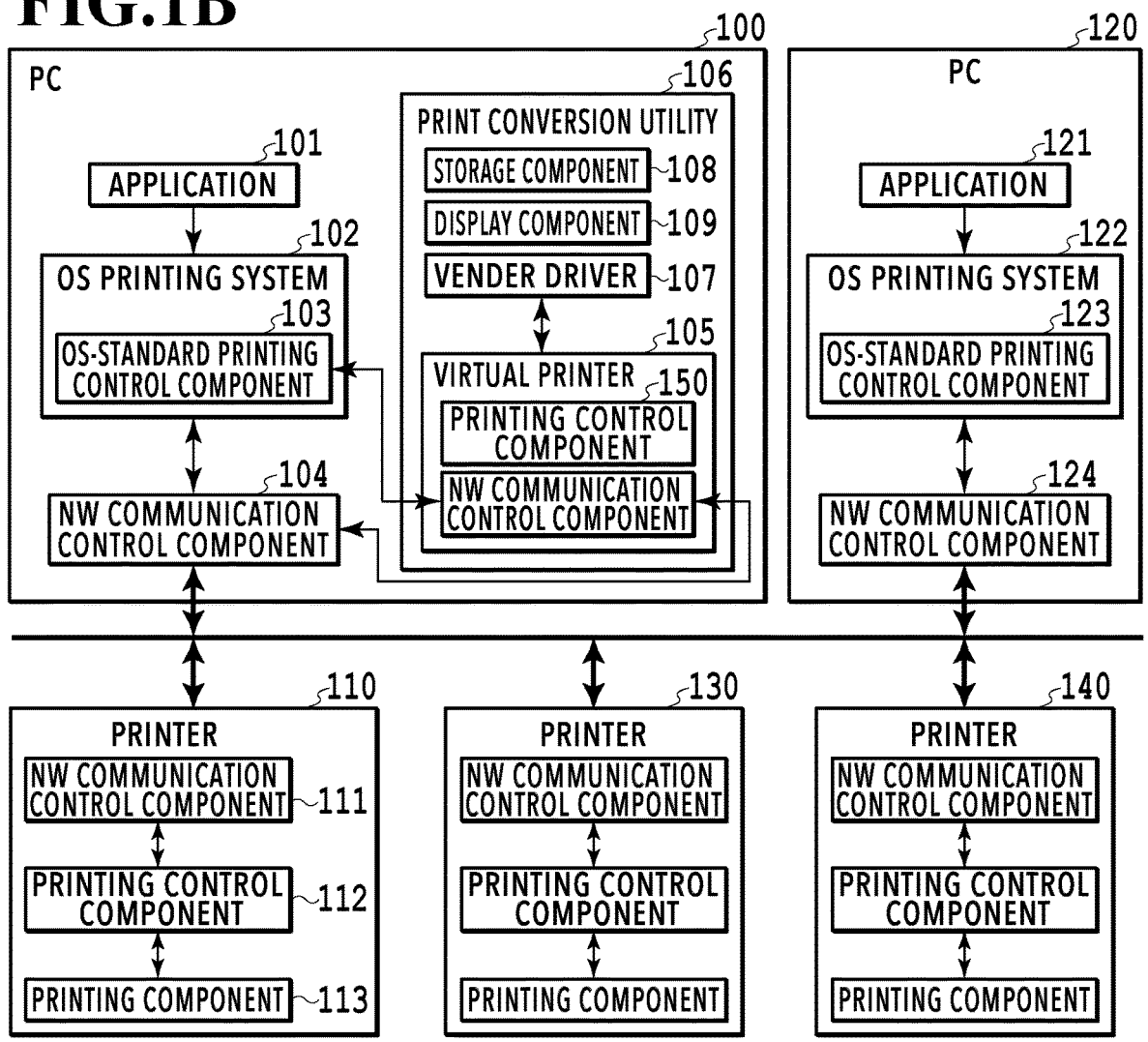

FIG. 1B is a diagram illustrating an entire configuration of the printing system in the present embodiment. First, a software configuration of the PC 100 will be described. The PC 100 includes an application 101, the OS printing system 102, a network (NW) communication control component 104, and a print conversion utility 106. The OS printing system 102 includes an OS-standard printing control component 103. The print conversion utility 106 includes a virtual printer 105, the vender driver 107, a storage component 108, a display component 109, and a printing control component 150. The print conversion utility 106 is for using a printer not compatible with OS-standard printing by means of the OS-standard printing function, and is installed in the PC 100 as required. The application 101 is drawing software that can run on the OS, which is basic software of the PC 100. Examples of the application 101 include word processing software for creating documents, image editing software, a web browser, and so on. Drawing data that can be generated with the application 101 is, for example, data of the Portable Document Format (PDF).

The OS printing system 102 is an element of the OS that performs printing control, and processes print requests from the application 101 one by one as jobs. The OS-standard printing control component 103 included in the OS printing system 102 is software having a standard function necessary for the generation of print data (OS-standard printing function). The OS-standard printing control component 103 performs a spool process on drawing data generated by the application 101 to generate print data of a predetermined format (standard format). Further, the OS-standard printing control component 103 performs a process of outputting the print data of the standard format thus generated to the NW communication control component 104, in order to send the print data of the standard format to the printer 110. Note that the OS-standard printing control component 103 in the present embodiment communicates with the printer 110 via the NW communication control component 104 by using the Internet Printing Protocol (IPP), which is a standard printing protocol. The OS-standard printing control component 103 also obtains ability information on the printer 110 via the NW communication control component 104 in order to determine whether the printer 110 supports the OS-standard printing function.

A procedure for a print instruction will be described below. First, a procedure for a print instruction addressed to the printer 110 supporting the OS-standard function will be described. After generating drawing data, the application 101 issues a print request to the OS printing system 102 based on a user instruction. The print request is introduced as a print job into a print queue of the OS printing system 102. Note that in the case of issuing a print request, a setting instruction from the user regarding the print settings can be received from a setting screen provided by the OS-standard printing function.

In the case where the print request is issued, a print job (print data) containing print setting information and the drawing data generated by the drawing application 101 is passed from the drawing application 101 to the OS printing system 102. The print setting information contains information such as the paper size, the paper feed method, or the print queue to be used perform the printing.

In response to receiving the print job, the OS-standard printing control component 103 of the OS printing system 102 generates print data of the predetermined format based on the OS-standard printing function.

The printer 110 compatible with the OS-standard printing function is capable of interpreting print data of the format based on the OS-standard printing function. The OS printing system 102 sends the generated print data to the printer 110 compatible with the OS-standard printing via the NW communication control component 104.

On the other hand, the printer 130 not compatible with the OS-standard printing is incapable of interpreting print data of the format based on the OS-standard printing function. Thus, to perform the printing, the print conversion utility 106 needs to be used. In a case of a print job for the printer 130 not compatible with the OS-standard printing function (a print job for which the virtual printer 105 is designated as the output target printer), the OS printing system 102 sends the generated print data to the virtual printer 105 launched by the print conversion utility 106. Then, the print conversion utility 106 converts the print data of the format based on the OS-standard printing function received by the virtual printer 105 into print data of a vender-specific format with the vender driver 107. The converted print data is sent to the printer 130 not compatible with the OS-standard printing function via the NW communication control component. The present embodiment assumes that the virtual printer 105 has been launched in the PC 100.

Note that, in order to issue a print instruction via the print conversion utility 106, both a print queue for the OS printing system 102 for receiving the print request from the application 101 and a print queue for the print conversion utility 106 need to be registered in advance. Here, the print queue for the print conversion utility 106 is a queue in which to introduce the print data sent to the virtual printer 105. In the case of registering settings, the print queue for the print conversion utility 106 is registered first. In response, the print conversion utility 106 launches the virtual printer 105. Thereafter, the print conversion utility 106 designates the virtual printer 105 and causes it to automatically register a print queue for the OS printing system 102.

The printer 110, the printer 130, and the printer 140 each include a NW communication control component 111, a printing control component 112, and a printing component 113. The printing control component 112 receives print data from the PC 100 via the NW communication control component 111 and controls the printing component 113 based on the print data to thereby execute printing. The printer 110 is a printer compatible with the OS printing system, and the printer 130 is a printer not compatible with the OS printing system. The printers 110 and 130 are printers that have executed printing before by using the print conversion utility 106. The printer 140, on the other hand, is a printer which is not compatible with the OS printing system and has never executed printing before by using the print conversion utility 106 and for which a print queue for the print conversion utility 106 has not been registered.

The storage component 108 included in the print conversion utility 106 holds settable lists supported by a printer (e.g., printer 130). The settable lists will be described later with reference to FIGS. 2 and 3. These settable lists may be held in the storage component 108 of the print conversion utility 106 in advance or obtained via communication with the printer.

The display component 109 included in the print conversion utility 106 controls the displaying of status information on the virtual printer 105 such as "out of paper", "cover is open", or "out of ink" and status information on a print job such as "printing" or "standby".

Figure 2:
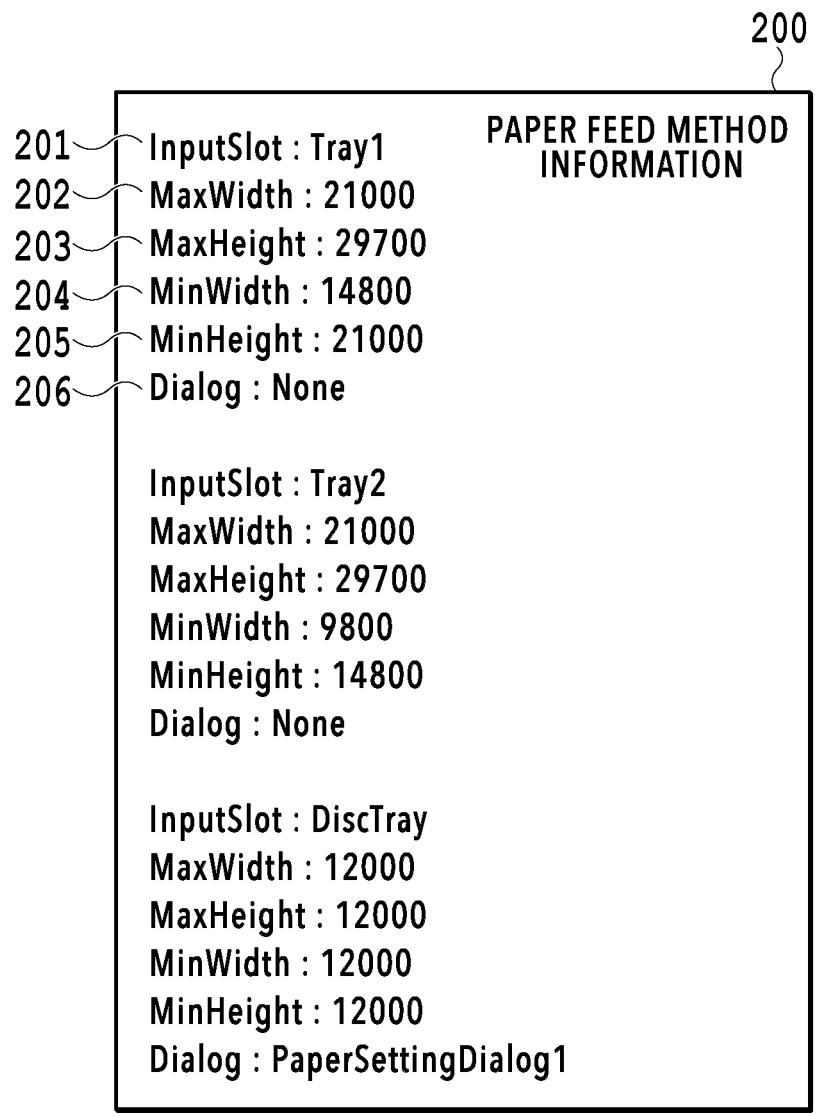
FIG. 2 is a diagram illustrating information on paper feed methods supported by a printer.

FIG. 2 is a diagram illustrating a settable list containing information on the paper feed methods supported by the printer 130 (information on holding units that feed paper). FIG. 2 exemplarily illustrates information on three holding units of a tray 1, a tray 2, and a disc tray representing the paper feed methods supported by the printer 130. Note that the disc tray technically is not a holding unit that "feeds paper" but is a holding unit that "holds" a "disc" such as a CD, which is a non-paper print medium. Nonetheless, the expression "feed paper" is used here for form's sake. Moreover, "disc" is also a non-paper print medium but may be expressed as a type of "paper" for form's sake. Tray1, Tray2, and DiscTray in FIG. 2 correspond to the tray 1, the tray 2, and the disc tray, respectively. The settable list contains a name 201, a maximum paper width 202, a maximum paper height 203, a minimum paper width 204, a minimum paper height 205, and a paper feed method guide dialogue 206 of each paper feed method (holding unit) which the printer 130 is compatible with. The maximum paper width 202, the maximum paper height 203, the minimum paper width 204, and the minimum paper height 205 are represented in units of ¹⁄₁₀₀ mm. The paper feed method guide dialogue 206 is information indicating whether the corresponding setting item (in FIG. 2, "Tray1", "Tray2", or "DiscTray") has a guide dialogue which is a specific notification screen. For a paper feed method that involves displaying a guide dialogue in a case of executing printing, the corresponding paper feed method guide dialogue's name is indicated. For a paper feed method that does not involve displaying a guide dialogue, "None" is indicated. Alternatively, for a paper feed method that does not involve displaying a guide dialogue, the paper feed method guide dialogue 206 does not have to be indicated.

Figure 3:
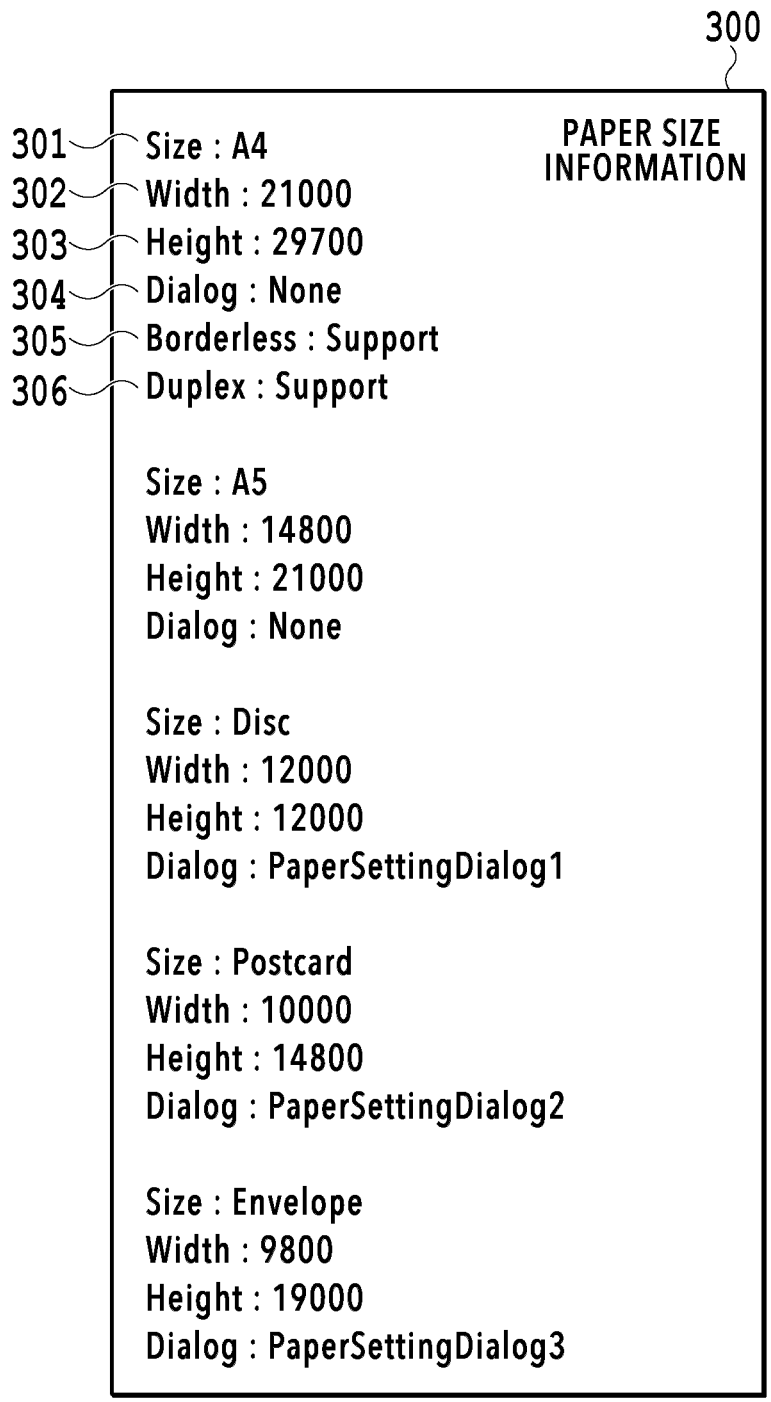
FIG. 3 is a diagram illustrating information on paper sizes supported by the printer.

FIG. 3 is a diagram illustrating a settable list containing information on the paper sizes supported by the printer 130. FIG. 3 exemplarily illustrates five sizes of A4, A5, disc, postcard, and envelope as the paper sizes supported by the printer 130. The settable list contains a name 301, a paper width 302, a paper height 303, a paper size guide dialogue 304, borderless printing information 305, and duplex printing information 306 of each paper size which the printer 130 is compatible with. The paper width 302 and the paper height 303 are represented in units of ¹⁄₁₀₀ mm. The paper size guide dialogue 304 is information indicating whether the corresponding setting item (in FIG. 3, "A4", "A5", "Disc", "Postcard", or "Envelope") has a guide dialogue which is a specific notification screen. For a paper size that involves displaying a guide dialogue in a case of executing printing, the corresponding guide dialogue's name is indicated. For a paper size that does not involve displaying a guide dialogue, "None" is indicated. Alternatively, for a paper size that does not involve displaying a guide dialogue, the paper size guide dialogue 304 does not have to be indicated. As the borderless printing information 305, "Support" is indicated in a case of a paper size capable of borderless printing. For paper sizes other than that capable of borderless printing, the borderless printing information 305 is not indicated or information other than "Support" is indicated. As the duplex printing information 306, "Support" is indicated in a case of a paper size capable of duplex printing. For paper sizes other than that capable of duplex printing, the duplex printing information 306 is not indicated or information other than "Support" is indicated. In FIG. 3, the printer 130 exemplarily supports borderless printing and duplex printing only for the A4 size.

Figure 4A:
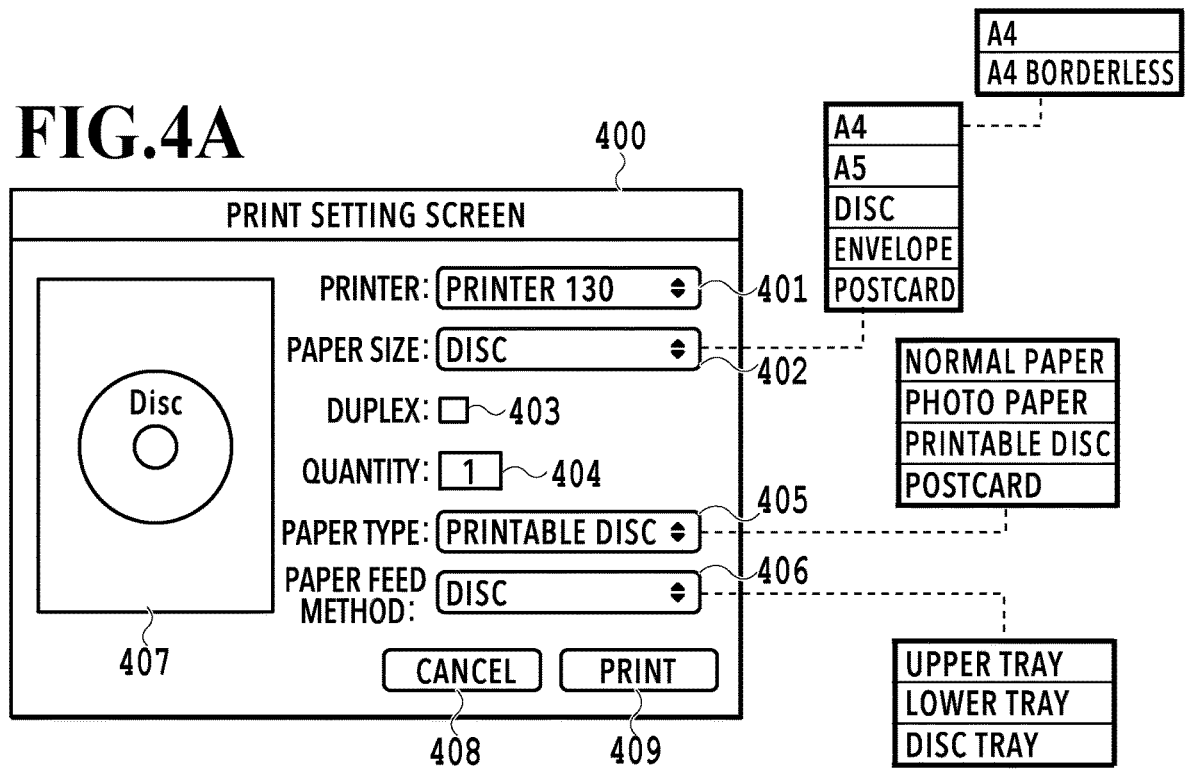
FIGS. 4A and 4B are diagrams illustrating a print setting screen in a case of setting disc printing with an OS-standard printing function.
Figure 4B:
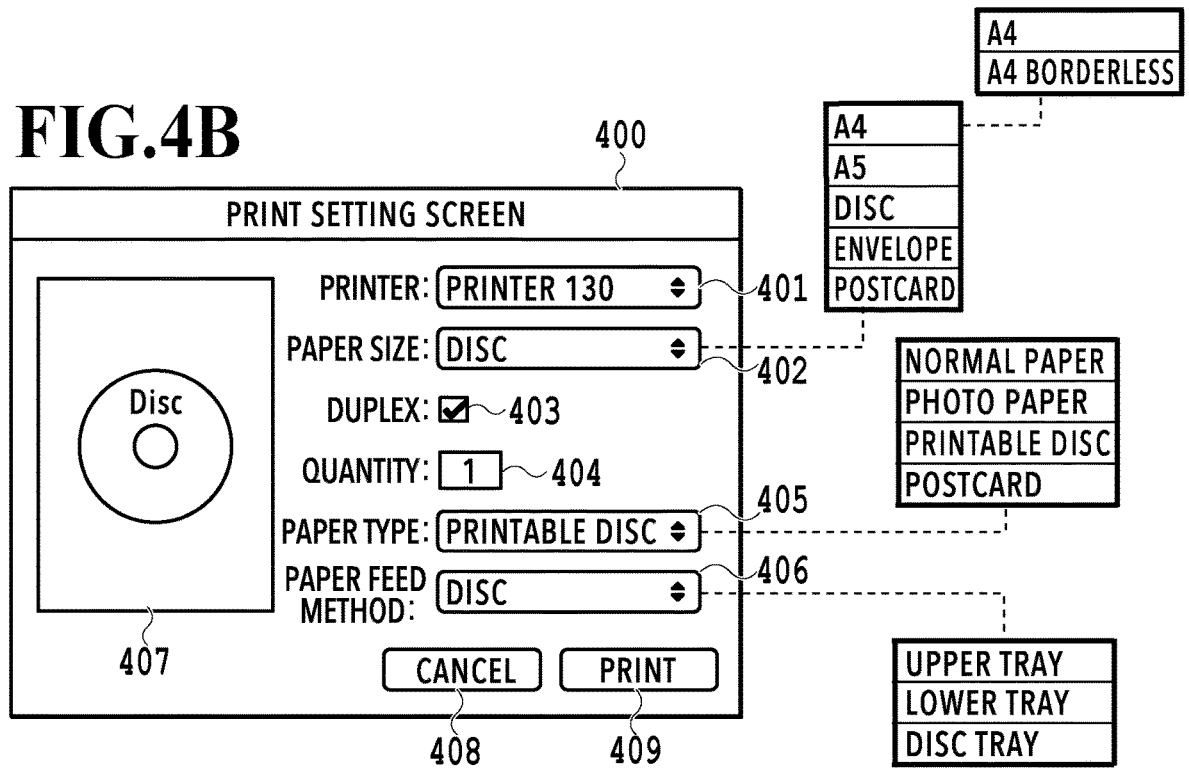

FIGS. 4A and 4B are diagrams illustrating a print setting screen in a case of setting disc printing under an environment with the OS-standard printing function. FIG. 4A is a schematic diagram illustrating a print setting screen 400 provided by the OS-standard printing function. FIG. 4B will be described in Embodiment 4 to be set forth later.

The print setting screen 400 includes a printer selection item 401 for selecting a printer to be caused to execute printing, a paper size selection item 402, a duplex printing selection item 403, a quantity selection item 404, and a paper type selection item 405. The print setting screen 400 also includes a paper feed method selection item 406, a print preview region 407, a cancel button 408, and a print button 409.

FIG. 4A illustrates print settings in a case where the user performs printing on a disc. In the paper feed method selection item 406 in FIG. 4A, "disc tray", which is a paper feed method that involves displaying a guide dialogue, is selected. Also, in the paper size selection item 402, "disc", which is a paper size that involves displaying a guide dialogue, is selected. Note that selecting the paper feed method means selecting the holding unit holding the printing-target print medium.

Figure 5:
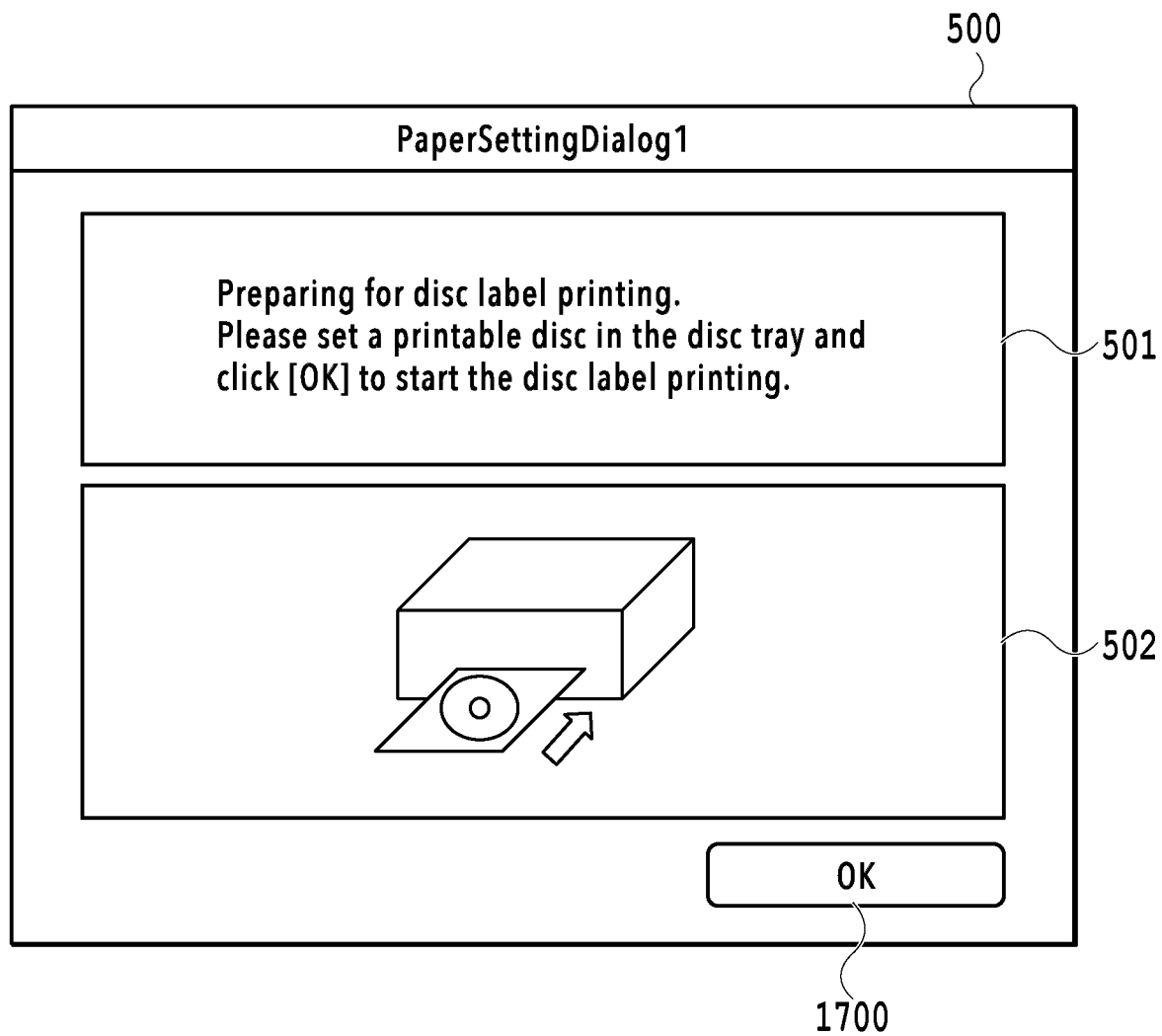
FIG. 5 is a diagram illustrating a guide screen displayed by a print conversion utility.

FIG. 5 is a diagram illustrating a disc printing guide dialogue 500 displayed by the print conversion utility 106. Note that this disc printing guide dialogue 500 is a dialogue equivalent to a dialogue displayed in a case of printing control using a conventional specific printer driver. The disc printing guide dialogue 500 includes an operation method message 501, an operation guide diagram 502, and an OK button 503. Under an environment where the conventional specific printer driver is used, control is performed such that the specific printer driver displays the disc printing guide dialogue 500 as illustrated in FIG. 5 on the PC screen in a case of setting a paper feed method in which the paper feed position and paper setting method are complicated, such as disc printing, and executing printing with that paper feed method. In this way, the user can check the operation method message 501 and the operation guide diagram 502 and set a disc in the printer. Control is performed such that the printer driver starts the printing in response to pressing the OK button 503. Also, in a case of setting a size with which the paper is fed with its top and bottom oriented in certain respective directions, such as postcard or envelope, and executing printing with the size, the driver displays a guide dialogue indicating a paper setting method according to the printer's specifications.

On the other hand, with the OS-standard printing function, individual printers' specifications cannot be taken into account. Thus, in a case of executing printing, the print data is sent to the printer with no guide dialogue displayed on the PC screen. In response to receiving the print data, the printer starts printing according to the print setting values in the print data. In the case of using the OS-standard printing function to perform printing with a printer not compatible with the OS-standard printing function, it is also possible to send the print data to the printer by using a functional component like the above-described print conversion utility. In the case of executing printing, however, control to display a guide dialogue on the PC screen is performed.

As a result, under the environment where the OS-standard printing function is used, the disc printing guide dialogue displayed in the case of using the specific printer driver is not displayed, which lowers the operability for the user.

To address this, in the present embodiment, in the case of using the OS-standard printing function to perform printing with a printer not compatible with the OS-standard printing function, the print conversion utility 106 performs a process of displaying a corresponding guide dialogue on the PC screen. Control in the present embodiment will be described below in detail.

Figure 6:
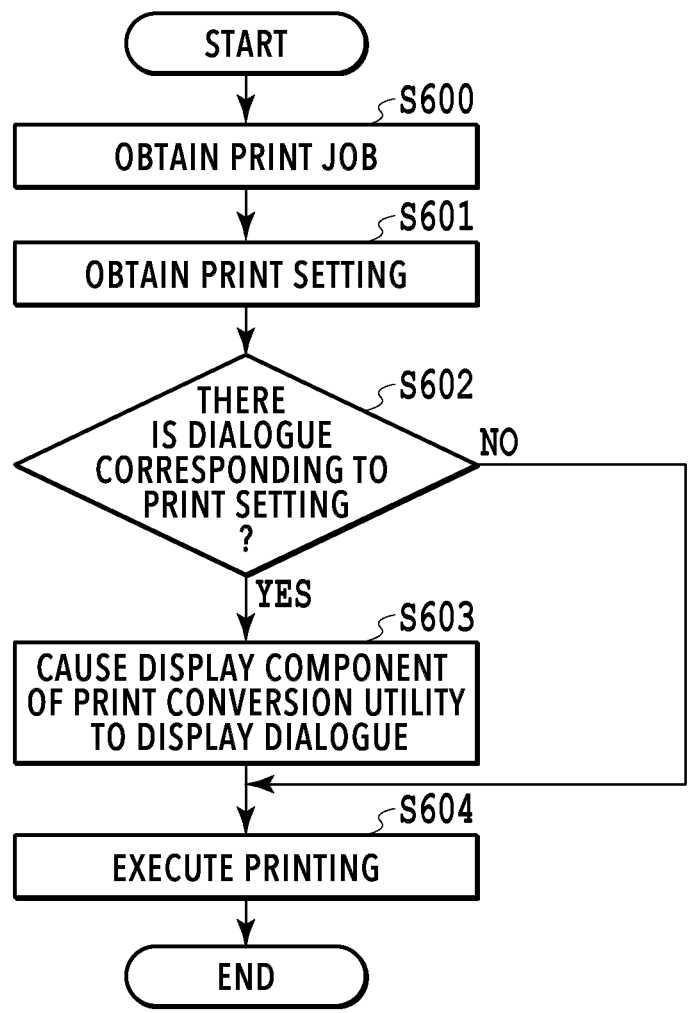
FIG. 6 is a diagram illustrating a flow of a process of displaying a guide screen by the print conversion utility.

FIG. 6 illustrates a flowchart of a process executed by the print conversion utility 106. More specifically, FIG. 6 illustrates a flow of a process in which the printing control component 150 of the print conversion utility 106 causes the display component 109 of the print conversion utility 106 to display the disc printing guide dialogue 500. In the following, the description will be given with the print conversion utility 106 as the actor of each process. In reality, however, the CPU 11 executes the program of the print conversion utility 106 stored in the ROM 12 or the external storage device 16 to implement the corresponding function. The same applies also to the flowcharts in Embodiment 2 and the subsequent embodiments.

Note that the process flow in FIG. 6 starts in a case where the user selects the print button 409 in the print setting screen 400 and the print conversion utility 106 obtains print data. Note that the user has selected a printer to be used in the printer selection item 401 in the print setting screen 400, and the OS printing system 102 sends the print data to the selected printer. For example, in a case where "printer 110" is selected in the printer selection item 401, the OS printing system 102 sends the print data directly to the printer 110 and, in a case where "printer 130" is selected, the OS printing system 102 sends the print data to the virtual printer 105 associated with the printer 130. That is, in the present embodiment, in the case where the printer 130 is selected in the printer selection item 401, the print conversion utility can obtain the print data via the NW communication control component of the virtual printer 105, and the process flow in FIG. 6 therefore starts.

In the present embodiment, a flow of the process by the print conversion utility 106 will be described using the flowchart in FIG. 6. Meanwhile, the symbol "S" in the description of each process means a step in the flowchart (the same applies below herein).

In S600, the print conversion utility 106 obtains a print job (obtains print data 700) from the OS printing system 102, and proceeds to S601. The print data obtained by the print conversion utility 106 from the OS printing system 102 is illustrated in FIG. 7.

Figure 7:
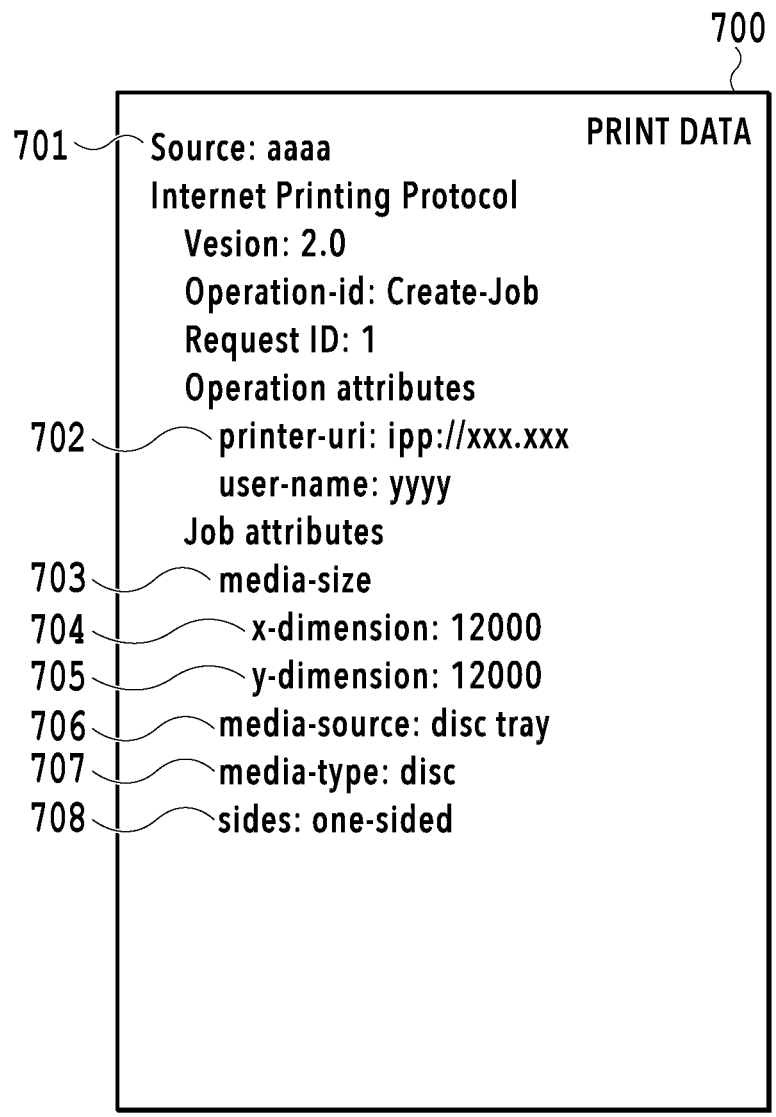
FIG. 7 is a diagram illustrating print data based on IPP, which is a standard printing protocol.

FIG. 7 is a diagram illustrating part of print data (in particular, print setting information) based on IPP, which is a standard printing protocol. The print data 700 contains address information 701 on the sender PC, printing execution printer information 702, paper size information 703, paper feed method information 706, paper type information 707, and duplex printing setting information 708. The paper size information 703 includes horizontal size information 704 and vertical size information 705. FIG. 7 exemplarily illustrates print data in a case of executing printing with print settings selected by the user in the print setting screen 400.

In S601, the print conversion utility 106 obtains the paper feed method information 706 (information on the holding unit) from the print data 700 obtained in S600. Further, the print conversion utility 106 obtains information on the paper feed method guide dialogue 206 corresponding to the paper feed method set in the print setting screen from the storage component 108, and proceeds to S602. For example, in a case where the paper feed method selected by the user is "disc tray", the paper feed method information 706 contained in the print data 700 is "disc tray". The print conversion utility 106 calls the paper feed methods in FIG. 2 out of the settable list stored in the storage component 108, and refers to the item "DiscTray", which is the name 201 of the paper feed method (holding unit) corresponding to the paper feed method information 706. Then, the print conversion utility 106 obtains "PaperSettingDialog1", which is information on the paper feed method guide dialogue 206 corresponding to the name 201 of the paper feed method thus referred to, from the storage component 108. Note that the information on the paper feed method guide dialogue 206 may be obtained from the printer and stored in the storage component 108.

In S602, the print conversion utility 106 determines whether a predetermined condition is met. Specifically, the print conversion utility 106 determines the information on the dialogue to be displayed obtained in S601. If the dialogue to be displayed is "None", the print conversion utility 106 determines that there is no dialogue corresponding to the setting value selected by the user as a print setting, and proceeds to S604 to execute printing. If the dialogue to be displayed is other than "None", the print conversion utility 106 determines that there is a dialogue corresponding to the setting value selected by the user as a print setting, and proceeds to S603. In S603, the print conversion utility 106 causes the display component 109 of the print conversion utility 106 to display the disc printing guide dialogue 500, which corresponds to the paper feed method guide dialogue 206 obtained in S601, on the display 14. As mentioned earlier, the disc printing guide dialogue includes the operation method message 501, the operation guide diagram 502, and the OK button 503. The user checks the operation method message 501 and the operation guide diagram 502, sets a disc in the printer, and presses the OK button 503. In response to this, the print conversion utility 106 proceeds to S604 to execute printing. In S604, the print conversion utility 106 converts the print data 700 obtained in S600 into print data compatible with the protocol specific to the printer 130, sends the converted print data to the printer via the NW communication control component, and terminates the process.

As described above, according to the present embodiment, it is possible to improve the convenience of printing in the case of using a PC equipped with an OS-standard printing function to perform the printing. Specifically, by referring to print data sent from the OS printing system 102, dialogue information corresponding to a paper feed method selected by the user is obtained. Based on the obtained dialogue information, the display component 109 of the print conversion utility 106 can then display a guide dialogue about usage such as the paper setting method on the display 14. This improves convenience.

Note that the above description has been given by taking a case where the user selects "disc tray" as an example, but the present embodiment is not limited to this case. For example, the present embodiment is applicable also to a case where the paper size selected is "postcard" by obtaining the horizontal size information 704 and the vertical size information 705 from the print data 700 in S601 and determining the information on the paper size guide dialogue 304. In the case of executing printing with "postcard" selected as the paper size, the horizontal size information 704 and the vertical size information 705 contained in the print data 700 are "10000" and "14800", respectively. Then, from the horizontal size information 704 and the vertical size information 705, the item "Postcard" in the list in FIG. 3 stored in the storage component 108 is referred to. As a result of the reference, "PaperSettingDialog2", which is the information on the paper size guide dialogue 304, is obtained from the storage component 108, and the corresponding dialogue is displayed.

Also, "PaperSettingDialog1" indicated as the guide dialogue for "DiscTray" in the paper feed method information in FIG. 2 is also indicated as the guide dialogue for "Disc" in the paper size information in FIG. 3. Thus, the guide dialogue of "PaperSettingDialog1" is displayed in a case where "printable disc" is selected in the paper type selection item 405 or in a case where "disc" is selected in the paper size selection item 402. Here, in the case where the paper type is "printable disc", "disc" is set as the paper size and the other paper sizes are not supported. In a case of executing printing with a setting that is not supported as above, a process of changing to a setting with which printing is possible or a process of displaying a guide dialogue indicating that an unselectable combination of settings has been selected as described in embodiments to be set forth later is performed.

Also, the print conversion utility 106 can be used also in a case of performing printing with a printer compatible with the OS-standard printing function, such as the printer 110, by using the OS-standard printing function. Specifically, the print conversion utility 106 may be used to expand the setting function for printing and may be used in a case of, for example, displaying a specific dialogue that cannot be displayed with the OS-standard printing function, and other similar cases. Note that in a case where the printer 110 is compatible with not only the OS-standard printing function but also a printer-specific protocol and is desired to perform printing based on more detailed print settings than the OS-standard printing function, print data compatible with the printer-specific protocol is sent.

Embodiment 2

Next, Embodiment 2 will be described. In Embodiment 1, in the case where there is a guide dialogue corresponding to a paper feed method selected by the user, the print conversion utility 106 executes the process of causing the display component 109 of the print conversion utility 106 to display the corresponding guide dialogue on the display 14. In Embodiment 2, the print conversion utility 106 performs a process of changing the method of displaying the guide dialogue by determining whether the printer includes a display unit. Specifically, in a case where the printer that is to perform printing has a display unit, the print conversion utility 106 performs a process of displaying the guide dialogue on at least one display unit selected by the user among the display unit 24 of the printer and the display 14 of the PC 100.

In the following description, descriptions common to those in Embodiment 1 are omitted, and only the differences will be described. In particular, in the following, a flow of a process by the print conversion utility 106 and a display unit on a printer body will be described as the differences from Embodiment 1.

Figure 8:
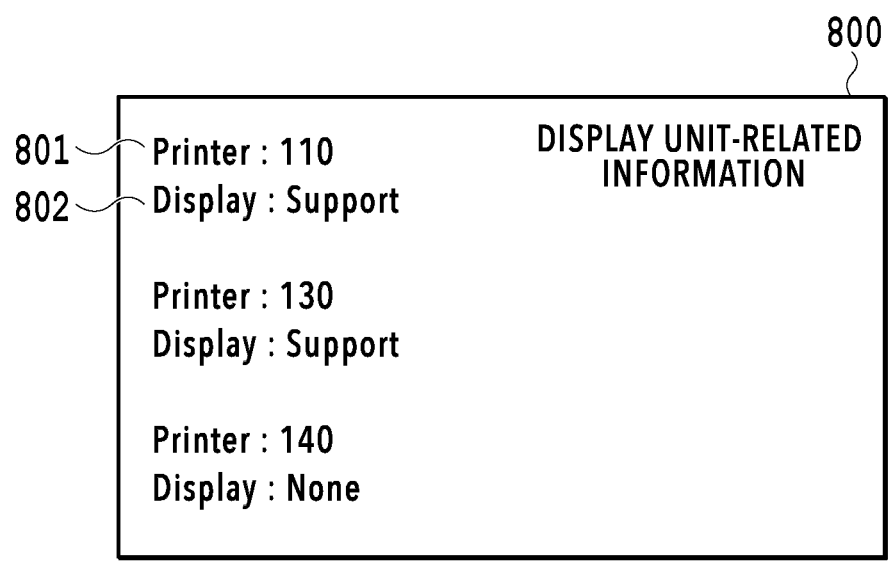
FIG. 8 is a diagram illustrating information on display units supported by printers.

FIG. 8 is a diagram illustrating display unit-related information 800 on printers. The display unit-related information is information on each printer indicating whether it includes a display unit. The display unit-related information 800 on printers may be held in the storage component 108 of the print conversion utility 106 in advance, or the display unit-related information may be obtained via communication with the printers and then held. In FIG. 8, the display unit-related information 800 on printers indicates a list of printers compatible with the print conversion utility 106. In this diagram, the display unit-related information on the printers 110, 130, and 140 is indicated as an example. The display unit-related information 800 contains each printer's name 801 and display unit information 802. As the display unit information 802, "Support" is indicated in a case of a printer including a display unit capable of displaying a guide dialogue, and "None" is indicated in a case of a printer not including a display unit capable of displaying a guide dialogue.

Figure 9:
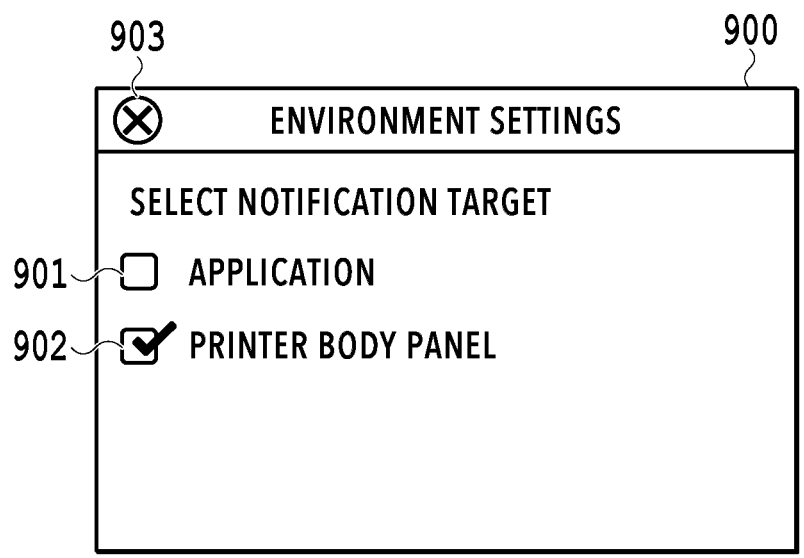
FIG. 9 is a diagram illustrating a notification target setting screen set by the print conversion utility.

FIG. 9 is a diagram illustrating a guide dialogue display target setting. A guide dialogue display target setting screen 900 is displayed as a setting screen for an environment setting of the print conversion utility 106. The guide dialogue display target setting screen 900 includes an application display unit setting 901 and a printer display unit setting 902 as guide dialogue display targets. In a case where the application display unit setting 901 is selected, the display component 109 of the print conversion utility 106 displays the guide dialogue on the display 14 of the PC. On the other hand, in a case where the printer display unit setting 902 is selected, it means to display the guide dialogue on the display unit 24 of the printer. In a case where the user configures the setting in the guide dialogue display target setting screen 900 before executing printing and presses a close button 903, the print conversion utility 106 can close the guide dialogue display target setting screen 900 and change the guide dialogue display target. In the diagram, only the printer display unit setting 902 is checked as an example. In a case where both items are checked, the display component 109 of the print conversion utility 106 displays the guide dialogue on both the display 14 and the display unit of the printer. In a case where neither of the items is checked, the display component 109 of the print conversion utility 106 does not display the guide dialogue.

Figure 10:
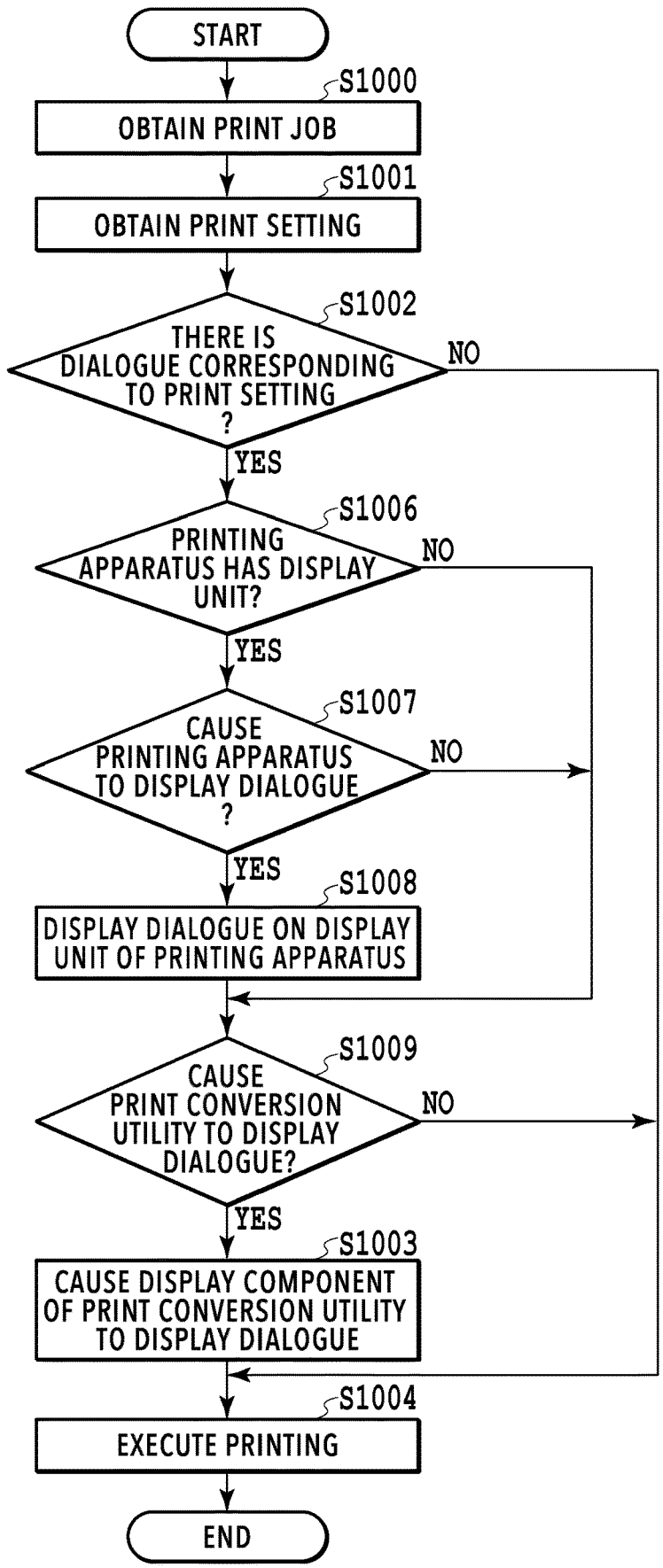
FIG. 10 is a diagram illustrating a flow of a process of displaying a guide screen by the print conversion utility.

FIG. 10 illustrates a flowchart of a process executed by the print conversion utility 106. More specifically, FIG. 10 illustrates a flow of a process in which the printing control component 150 of the print conversion utility 106 changes the method in which the display component 109 of the print conversion utility 106 displays the paper feed method guide dialogue 206 according to display unit information held in the printer. Note that the process flow in FIG. 10 starts in a case where the user selects the print button 409 in the print setting screen 400 and the print conversion utility 106 obtains a print job. S1000 to S1001 and S1003 to S1004 in FIG. 10 are similar to S600 to S601 and S603 to S604 described in FIG. 6 in Embodiment 1, and description thereof is therefore omitted.

In the present embodiment, in FIG. 10, the print conversion utility 106 obtains the print data 700 in S1000, obtains the printing execution printer information 702 from the print data 700 in S1001, and then proceeds to S1002. Moreover, if determining in S1002 that there is a guide dialogue corresponding to the print setting, the print conversion utility 106 proceeds to S1006. On the other hand, if determining in S1002 that there is not a guide dialogue corresponding to the print setting, the print conversion utility 106 proceeds to S1004. In S1006, from the display unit-related information 800, the print conversion utility 106 obtains the name 801 of the printer matching the printing execution printer information 702 obtained in S1001, and determines the display unit information 802 corresponding to the name 801 of the printer thus obtained. If the display unit information 802 of the printer determined in S1006 is "Support" indicating that the printer includes a display unit capable of displaying a guide dialogue, the print conversion utility 106 proceeds to S1007 and, otherwise, proceeds to S1009.

In S1007, the print conversion utility 106 determines whether a setting to display the guide dialogue on the printer has been configured, according to the printer display unit setting 902 configured in advance by the user. If the setting to display the guide dialogue on the printer has been configured, the print conversion utility 106 proceeds to S1008 and, otherwise, proceeds to S1009.

In S1008, the print conversion utility 106 sends an instruction to display the guide dialogue on the display unit of the printer to the printer via the NW communication control component, and proceeds to S1009.

In S1009, according to the application display unit setting 901, the print conversion utility 106 determines whether a setting to cause the display component 109 of the print conversion utility 106 to display the guide dialogue has been configured. If the setting to cause the display component 109 of the print conversion utility 106 to display the guide dialogue has been configured, the display component 109 of the print conversion utility 106 displays the guide dialogue in S1003 and, otherwise, printing is executed in S1004. In S1004, the print conversion utility 106 converts the print data 700 obtained in S1000 into print data compatible with the protocol specific to the printer 130, sends the converted print data to the printer via the NW communication control component, and terminates the process.

In this way, in the case of using a printer having a display unit, such as a panel, to execute printing, the user can set paper while checking the paper setting method on the printer body. This improves the operability.

Also, in the present embodiment, by displaying the guide dialogue on both the display 14 with the display component 109 of the print conversion utility 106 and the display unit of the printer, it is easier for the user to check the paper setting method. On the other hand, by causing neither the display component 109 of the print conversion utility 106 nor the display unit of the printer to display the guide dialogue, a user knowing the paper setting method can execute printing without stopping it.

As described above, in the present embodiment, the print conversion utility 106 can cause the printer and the display component 109 of the print conversion utility to display the guide dialogue depending on whether the printer has a display unit and the setting on the display method. This improves the operability.

Embodiment 3

Next, Embodiment 3 will be described. Embodiments 1 and 2 assume that the print conversion utility 106 is present inside the PC 100, which executes printing. In Embodiment 3, printing is performed with a printer from a PC other than the PC 100, in which the print conversion utility 106 is launched, via the print conversion utility 106.

In the following description, descriptions common to those in Embodiments 1 and 2 are omitted, and only the difference will be described. In particular, in the following, a flow of a process via the print conversion utility 106 from a PC other than the one in which the print conversion utility 106 is launched will be described as the difference from Embodiments 1 and 2.

First, a configuration of the printing system in the present embodiment will be described using FIGS. 1A and 1B. A PC 120 includes an application 121, an OS printing system 122, and a network (NW) communication control component 124. The OS printing system 122 includes an OS-standard printing control component 123. The OS printing system 122 is the same as the OS printing system 102, and the NW communication control component 124 is the same as the NW communication control component 104, and description thereof is therefore omitted. Incidentally, the PC 120 may or may not have a print conversion utility. In other words, a PC having a print conversion utility may perform printing by using a print conversion utility in another PC connected to the network, instead of the print conversion utility in itself.

Next, a procedure for a print instruction from the PC 120 will be described. A difference from the case with the PC 100 is that, for a print job from the printer 130 not compatible with the OS-standard printing function, the OS printing system 122 sends the generated print data to the virtual printer 105 launched by the print conversion utility 106 in the PC 100 via the NW communication control component.

Figure 11:
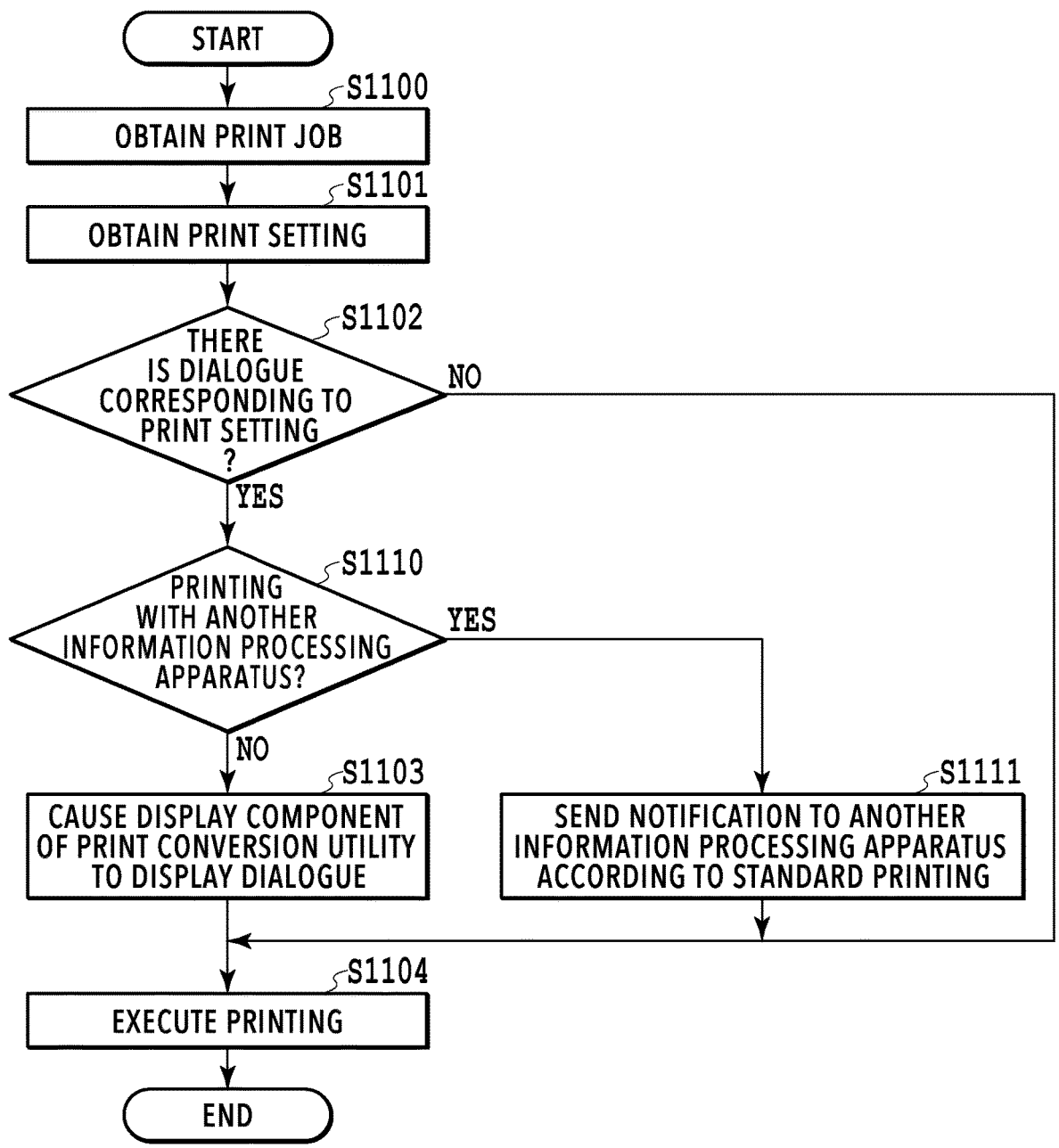
FIG. 11 is a diagram illustrating a flow of a process of displaying a guide screen by the print conversion utility.

FIG. 11 illustrates a flowchart of a process executed by the print conversion utility 106. More specifically, FIG. 11 illustrates a flow of a process in which the printing control component 150 of the print conversion utility 106 changes the method in which the display component 109 of the print conversion utility 106 displays the paper feed method guide dialogue 206 according to the PC that has sent a print instruction. Note that the process flow in FIG. 11 starts in a case where the user selects the print button 409 in the print setting screen 400 displayed on the PC 120 and the print conversion utility 106 obtains a print job. S1100 to S1101 and S1103 to S1104 in FIG. 11 are similar to S600 to S601 and S603 to S604 described in FIG. 6 in Embodiment 1, and description thereof is therefore omitted.

In the present embodiment, in FIG. 11, the print conversion utility 106 obtains the address information 701 on the PC which has sent the print instruction from the print data 700 in S1101, and proceeds to S1102. The address information 701 is information such as the IP address (IPv4/IPv6) and Mac address of the apparatus on the network. Then, if determining in S1102 that a setting value indicating that there is a dialogue which needs to be displayed is selected, the print conversion utility 106 proceeds to S1110. In S1110, the print conversion utility 106 refers to the address information 701 obtained in S1101 and determines whether the printing has been requested from another information processing apparatus. That is, the print conversion utility 106 determines whether the PC 100, in which the print conversion utility 106 is launched, and the PC which has sent the print instruction are different PCs. If determining in S1110 that they are different PCs, the print conversion utility 106 proceeds to S1111 and, otherwise, proceeds to S1103. In S1111, the print conversion utility 106 sends a notification to the PC which has sent the print instruction according to the standard printing protocol, and proceeds to S1104. Note that in S1111, the print conversion utility 106 uses the protocol of the OS standard function to send an error notification to the OS printing system 122 of the PC 120. This notification is a notification that prompts the user to check the printer for an error. In response to receiving the notification via the NW communication control component, the OS printing system 122 displays a message on the PC screen indicating that the printer should be checked, instead of the dialogue. In this way, the user having initiated printing with the PC 120 can set paper while checking what is displayed on the printer in the case where the printer body has a display unit.

In S1104, the print conversion utility 106 converts the print data 700 obtained in S1100 into print data compatible with the protocol specific to the printer 130, sends the converted print data to the printer via the NW communication control component, and terminates the process.

As described above, in the case where a print instruction is sent from a PC in which the print conversion utility 106 is not launched, a notification prompting an error check is sent to this PC by using the protocol of the OS standard function, instead of the guide dialogue. This leads to an improvement in operability. Moreover, since the guide dialogue itself is not displayed, as mentioned above, the printing can be smoothly executed without being stopped.

Embodiment 4

Next, Embodiment 4 will be described. In Embodiment 4, the print conversion utility 106 performs a process of displaying a print setting re-configuration screen (hereinafter referred to as the re-configuration screen) for receiving print settings again in a case where the user executes printing with a combination of print settings with which the printing is impossible.

In the following description, descriptions common to those in Embodiments 1 to 3 are omitted, and only the difference will be described. In particular, in the following, a process for the re-configuration screen by the print conversion utility 106 will be described as the difference from Embodiments 1 to 3.

Figure 12:
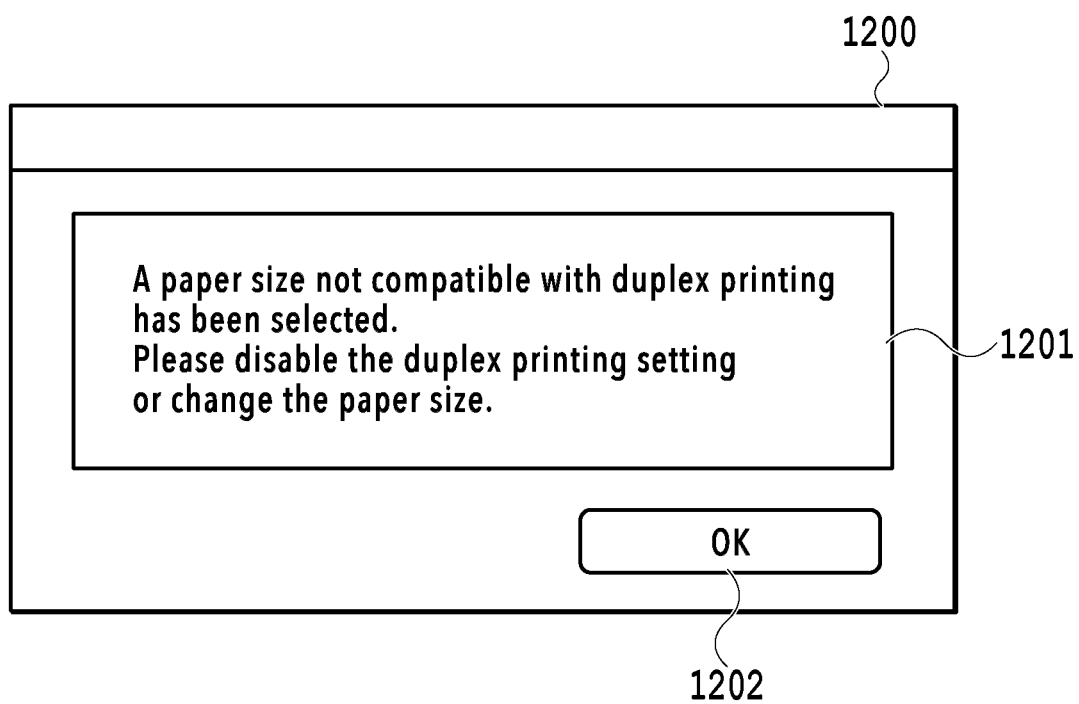
FIG. 12 is a diagram illustrating a guide screen displayed by a vender driver in a case of executing printing.

With a conventional specific printer driver, control is performed such that a print setting mismatch guide dialogue 1200 as illustrated in FIG. 12 is displayed on the PC screen in a case where the user executes printing with an unselectable combination of print settings. In a case where the user checks a guide message 1201 in the print setting mismatch guide dialogue 1200 and presses an OK button 1202, the printer driver can close the print setting mismatch guide dialogue 1200 and return to the print setting screen before the execution of the printing. Also, the conventional printer driver controls the print setting screen such that unusable setting values are grayed out to be not selectable for the user. Incidentally, there are OS printing systems that cannot display a guide dialogue or gray out unusable settings values in a case of executing printing. In a case of using such an OS printing system to issue a print instruction, it may be impossible to obtain a desired printing result if the user executes printing with an unusable combination of setting values selected. In the present embodiment, in the case of executing printing with an unusable combination of setting values selected, the print conversion utility is caused to display a print setting screen so that the print settings can be re-configured to a selectable combination of print settings.

Figure 13:
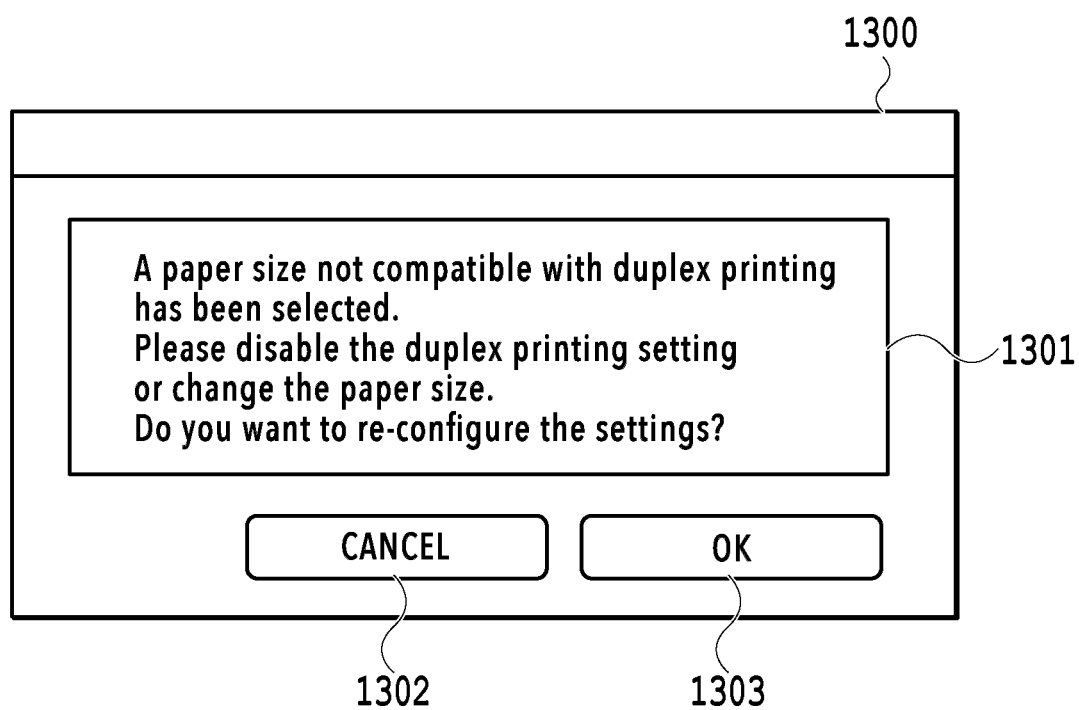
FIG. 13 is a diagram illustrating a guide screen displayed by the print conversion utility in a case of executing printing.

Next, the display component 109 of the print conversion utility 106 in the case where the user executes printing with an unusable combination of setting values selected will be described using FIGS. 4B, 13, and 14. FIG. 4B is a schematic diagram illustrating the print setting screen 400 provided by the OS-standard printing function, as with FIG. 4A.

In the print setting screen 400 in FIG. 4B, "disc size" is selected in the paper size selection item 402 and "duplex printing" is selected in the duplex printing selection item 403 as an example. FIG. 13 is a schematic diagram illustrating a guide dialogue 1300 as a guide to re-set setting values displayed in the case where an unusable combination of setting values is selected. In a guide region 1301 is displayed a guide indicating that an unsettable combination has been selected and that the setting values need to be changed in order to execute printing. In a case where the user presses a cancel button 1302 in the guide dialogue 1300, the print conversion utility 106 closes the dialogue and terminates the print job. In a case where the user presses an OK button 1303 in the guide dialogue 1300, the print conversion utility 106 closes the dialogue and displays the re-configuration screen illustrated in FIG. 14.

Figure 14:
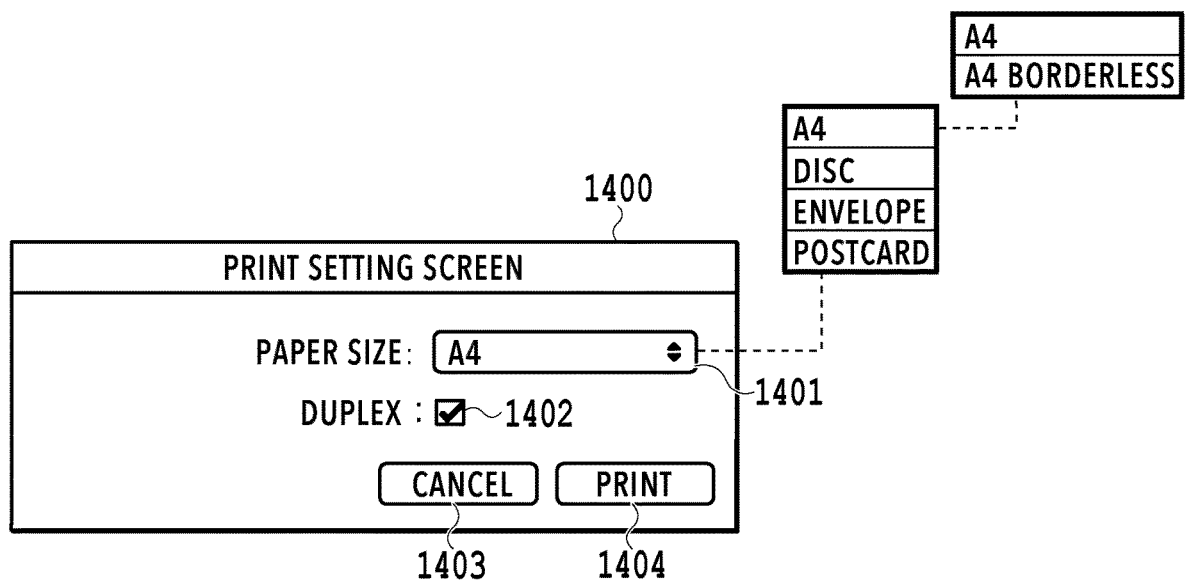
FIG. 14 is a diagram illustrating a print setting re-configuration screen displayed by the print conversion utility.

FIG. 14 is a schematic diagram of a re-configuration screen 1400 indicating only parts in the print conversion utility 106 that need to be re-configured. The re-configuration screen 1400 provided by the print conversion utility 106 includes a paper size selection item 1401 and a duplex printing selection item 1402. There-configuration screen 1400 also includes a cancel button 1403 and a print button 1404. The paper size selection item 1401 allows the user to select a paper size which can be used with the printer, and receives a change from the paper size selected in the paper size selection item 402 in the print setting screen 400. The duplex printing selection item 1402 allows the user to configure the duplex printing setting, and receives a change from the duplex printing setting selected in the duplex printing selection item 403 in the print setting screen 400.

Figure 15:
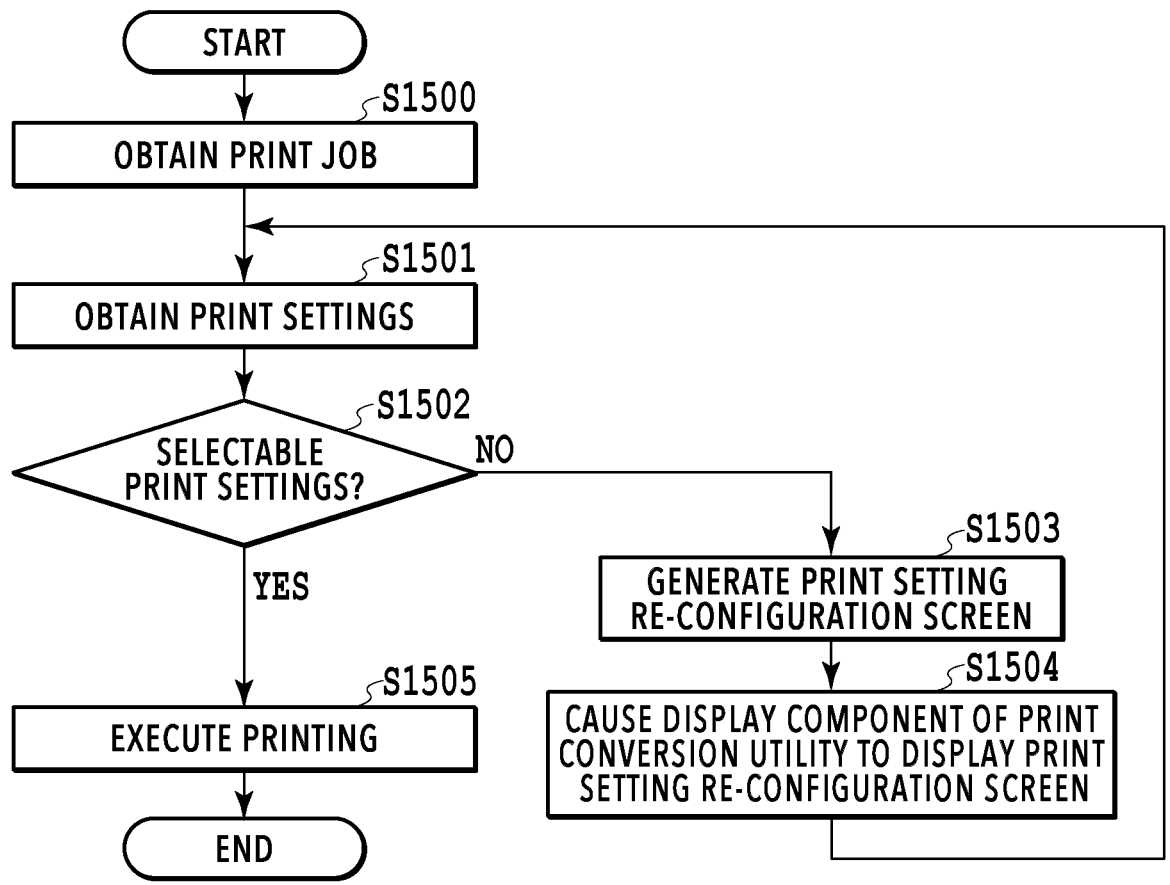
FIG. 15 is a diagram illustrating a flow of a process of displaying the print setting re-configuration screen by the print conversion utility.

FIG. 15 illustrates a flowchart of a process executed by the print conversion utility 106. More specifically, FIG. 15 illustrates a flow of a process in which the printing control component 150 of the print conversion utility 106 notifies the display component 109 of the print conversion utility 106 of the re-configuration screen 1400. Note that the process flow in FIG. 15 starts in a case where the user selects the print button 409 in the print setting screen 400 and the print conversion utility 106 obtains a print job.

In the present embodiment, a flow of the process by the print conversion utility 106 will be described using the flowchart in FIG. 15. In S1500, the print conversion utility 106 obtains the print data 700 from the OS printing system 102, and proceeds to S1501.

In S1501, the print conversion utility 106 obtains the horizontal size information 704 and the vertical size information 705 as the paper size and the duplex printing setting information 708 from the print data 700 obtained in S1500. Further, the print conversion utility 106 obtains information related to the duplex printing information 306 corresponding to the obtained paper size from the storage component 108, and proceeds to S1502. For example, in a case where the paper size selected by the user is "disc", the print conversion utility 106 obtains the item "Disc" in the list in FIG. 3 stored in the storage component 108 from the storage component 108. Note that the information on the paper size may be obtained from the printer and stored in the storage component 108.

In S1502, the print conversion utility 106 determines the duplex printing information obtained in S1501. If the duplex printing information is "Support", the print conversion utility 106 determines that duplex printing can be used with the paper size selected by the user, and proceeds to S1505 to execute printing. In S1505, the print conversion utility 106 converts the print data 700 obtained in S1200 into print data compatible with the protocol specific to the printer 130, sends the converted print data to the printer via the NW communication control component, and terminates the process. If the duplex printing information is other than "Support" and the duplex printing setting information 708 is set to be "two-sided" representing a duplex setting, the print conversion utility 106 determines that the combination of setting values selected by the user as the print settings cannot be used, and proceeds to S1503. In S1503, the print conversion utility 106 generates the re-configuration screen 1400 based on the information determined in S1502. Since duplex printing cannot be performed with the paper size selected by the user, the print conversion utility 106 generates a re-configuration screen 1400 for the user to select a paper size and duplex printing again, and proceeds to S1504. In S1504, the print conversion utility 106 causes the display component 109 of the print conversion utility 106 to display the re-configuration screen 1400 generated in S1503, and receives an input from the user. Note that in S1504, the re-configuration screen 1400 may be displayed after the guide dialogue 1300 illustrated in FIG. 13 is displayed. Alternatively, the re-configuration screen 1400 may be displayed along with the guide text described in the guide dialogue in FIG. 13. If an unusable combination of print settings is set in the re-configuration screen 1400, a guide dialogue as illustrated in FIG. 13 can be displayed again. Also, with the RE-configuration screen provided by the print conversion utility 106, unusable setting values can be grayed out to be not selectable for the user. In a case where the user presses the cancel button 1403 in the re-configuration screen 1400, the print conversion utility 106 closes the re-configuration screen 1400 and terminates the process. In a case where the user presses the print button 1404 in the re-configuration screen 1400, the print conversion utility 106 changes the setting values of the paper size and duplex printing in the print job to the setting values of the paper size selection item 1401 and the duplex printing selection item 1402. That is, the print conversion utility 106 updates the setting values of the paper size and duplex printing in the print data 700. Further, the print conversion utility 106 closes the re-configuration screen 1400 and returns to S1501.

As described above, in the present embodiment, the print conversion utility causes the display component 109 to display the re-configuration screen and receives print settings via it. In this way, the user can check the print setting(s) required to be changed. This improves convenience. Moreover, in this case, the user does not have to configure the print settings in the print setting screen 400 again. This further improves convenience.

Note that the above description has been given by taking a case where the user selects "disc" and "duplex printing" as an example, but the present embodiment is not limited to this case. For example, since the paper width 302 of "Postcard" in the list in FIG. 3 is smaller than the minimum paper width 204 of "Tray1" in the list in FIG. 2, it is impossible to use "Postcard" for "Tray1". The present embodiment is applicable also to a case where the paper size usable in a particular paper feed method is limited as above.

Note that the present embodiment is applicable to both a printer compatible with the OS-standard printing function and a printer not compatible with the OS-standard printing function. In the case of using an OS printing system that cannot display a guide dialogue or gray out unusable setting values in a case of executing printing, the above problem can be solved by using the print conversion utility 106.

Embodiment 5

Next, Embodiment 5 will be described. In Embodiment 4, the print conversion utility 106 executes the process of causing the display component 109 to display the re-configuration screen in the case where duplex printing with a paper size selected by the user is not supported. In Embodiment 5, the print conversion utility 106 performs a process of changing the method of displaying the re-configuration screen by obtaining a setting value of the printer body. The present embodiment will be described on the assumption that the paper size "disc" and "duplex printing" have been selected in the print setting screen, as with Embodiment 4.

In the following description, descriptions common to those in Embodiments 1 to 4 are omitted, and only the differences will be described. In particular, in the following, a flow of a process by the print conversion utility 106 and the setting value of the printer body will be described as the differences from Embodiments 1 to 4.

Figure 16:
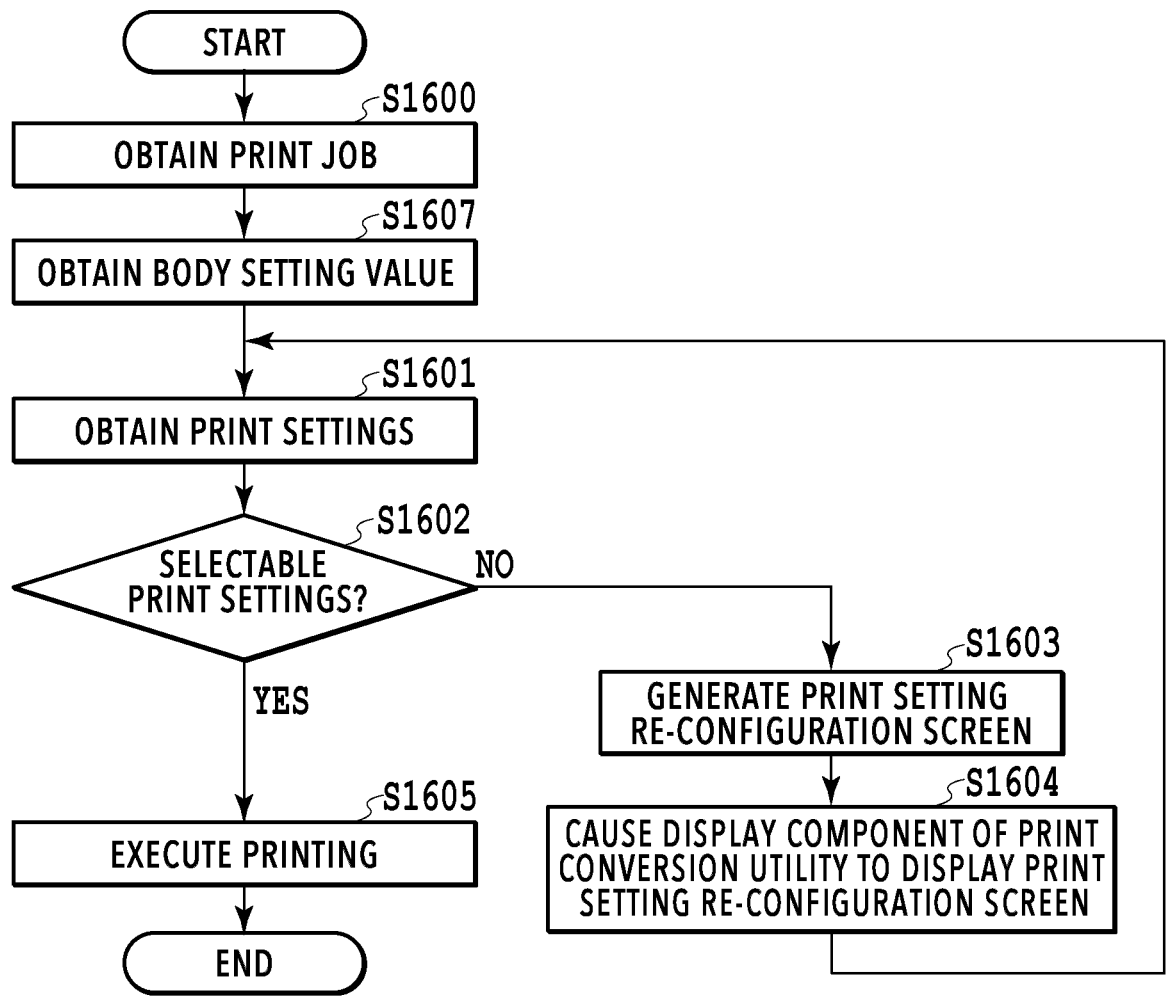
FIG. 16 is a diagram illustrating a flow of a process of displaying the print setting re-configuration screen by the print conversion utility.

FIG. 16 illustrates a flowchart of a process executed by the print conversion utility 106. More specifically, FIG. 16 illustrates a flow of a process in which the printing control component 150 of the print conversion utility 106 changes the method in which the display component 109 of the print conversion utility 106 displays the re-configuration screen 1400 according to the paper setting of the printer body. Note that the process flow in FIG. 16 starts in a case where the user selects the print button 409 in the print setting screen 400 and the print conversion utility 106 obtains a print job. Note that S1601 to S1602 and S1604 to S1605 in FIG. 16 are similar to S1501 to S1502 and S1504 to S1505 described in FIG. 15 in Embodiment 4, and description thereof is therefore omitted.

In the present embodiment, in FIG. 16, the print conversion utility 106 obtains the print data 700 in S1600 and proceeds to S1607. In S1607, the print conversion utility 106 obtains the body setting value and proceeds to S1601. Here, the paper size set in the printer body is obtained as the body setting value as an example. The body setting value may be obtained via communication with the printer body, or a value set by the user in the print conversion utility 106 before the execution of the printing may be obtained. In S1603, the print conversion utility 106 generates the re-configuration screen based on the information determined in S1602 and the body setting value obtained in S1607. For example, in a case where "A4" size is set in the printer body, the print conversion utility 106 obtains "A4" size as the body setting value in S1607. In S1603, based on the body setting value obtained in S1607, the print conversion utility 106 generates a re-configuration screen in which "A4" is displayed in the paper size selection item 1401 and only the duplex printing selection item 1402 can be selected. In a case where settings with which printing is possible are configured in the re-configuration screen, the print conversion utility 106 converts the print data 700 obtained in S1600 into print data compatible with the protocol specific to the printer 130, sends the converted print data to the printer, and terminates the process. In this way, the user can configure the print settings based on the paper set in the printer body. This improves convenience.

As described above, in the present embodiment, the print conversion utility can cause the display component 109 to display a re-configuration screen based on the paper set in the printer body by the user. This improves convenience.

Note that the above description has been given by taking as an example a case where the user sets "A4" size in the printer body and "disc" and "duplex printing" are selected in the print setting screen, but the present embodiment is not limited to this case. For example, in a case where "disc" size is set in the printer body, duplex printing cannot be used for "disc" size, as indicated by the duplex printing information 306 in FIG. 3. Thus, in S1603, a re-configuration screen is generated in which "disc" is displayed in the paper size selection item 1401 and the duplex printing selection item 1402 cannot be selected. As described above, the present embodiment is applicable also to a case of a paper size with which a usable function is limited.

Embodiment 6

Next, Embodiment 6 will be described. In Embodiments 4 and 5, in a case where duplex printing is not supported for a paper size selected by the user, the print conversion utility 106 executes the process of generating a re-configuration screen in which a paper size and duplex printing can be set again. In Embodiment 6, the print conversion utility 106 performs a process of displaying a re-configuration screen including setting values other than the paper size and duplex printing and a print preview.

In the following description, descriptions common to those in Embodiments 1 to 5 are omitted, and only the differences will be described. In particular, in the following, a setting item display configuration of and a flow of a process by the print conversion utility 106 will be described as the differences from Embodiments 1 to 5.

Figure 17:
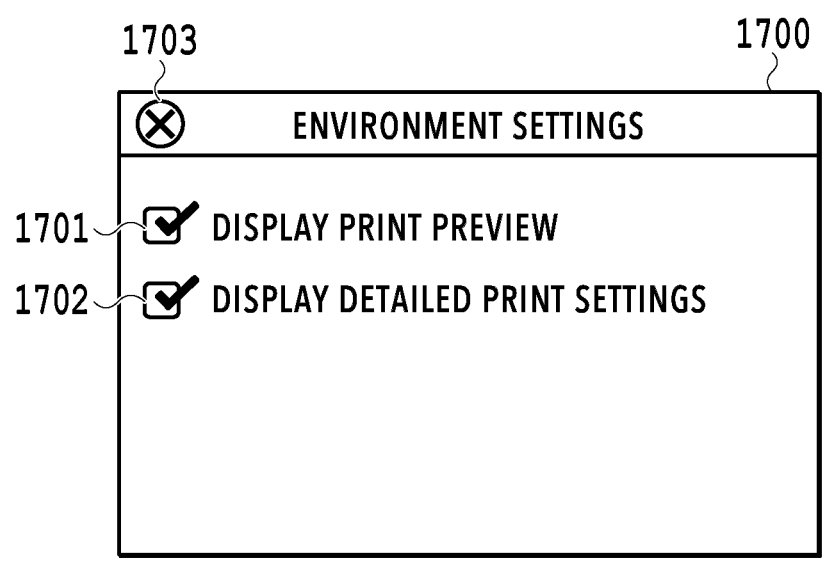
FIG. 17 is a diagram illustrating a setting screen for setting items to be displayed with the print conversion utility.

FIG. 17 is a diagram illustrating the settings of items to be displayed in the re-configuration screen. A print display item re-setting screen 1700 to be displayed by the print conversion utility 106 includes a print preview display setting 1701 and a detail item display setting 1702 as items to be displayed for re-configuration of print settings. In a case where the user, before executing printing, configures the settings in the print display item re-setting screen 1700 and presses a close button 1703, the print conversion utility 106 can close the print display item re-setting screen 1700 and change setting items in the re-configuration screen. In FIG. 17, the print preview display setting 1701 and the detail item display setting 1702 are checked as an example. The re-configuration screen in this case is illustrated in FIG. 18.

Figure 18:
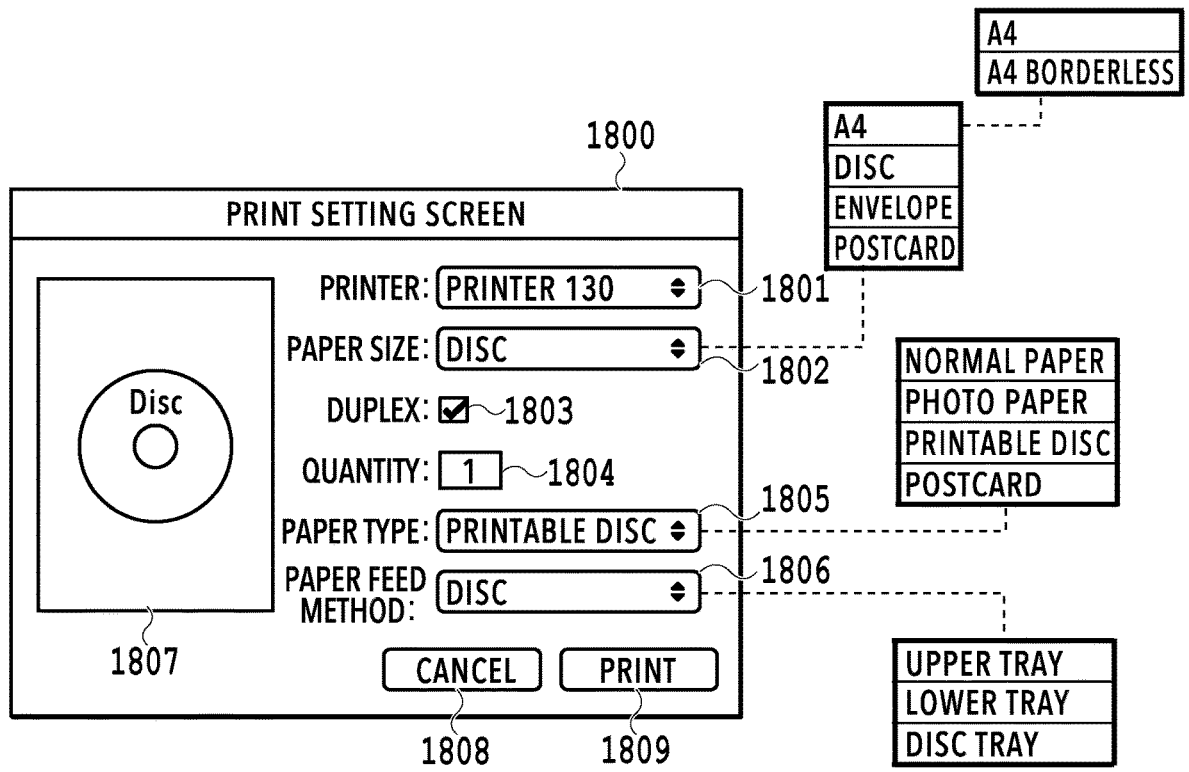
FIG. 18 is a diagram illustrating a print setting re-configuration screen displayed by the print conversion utility.

FIG. 18 is a schematic diagram illustrating a re-configuration screen 1800 including a print preview provided by the print conversion utility 106 and all configurable setting items. The re-configuration screen 1800 includes a printer selection item 1801 for selecting a printer to be caused to execute printing, a paper size selection item 1802, a duplex printing selection item 1803, a quantity selection item 1804, and a paper type selection item 1805. The re-configuration screen 1800 also includes a paper feed method selection item 1806 and a print preview region 1807. The re-configuration screen 1800 includes a cancel button 1808 and a print button 1809 as well. Note that the print conversion utility 106 holds information on registered printers and, in the printer selection item 1801 in FIG. 18, can display a list of printers previously registered as a virtual printer.

Consider, for example, a case where the print conversion utility 106 has previously registered the printers 110 and 130 as the virtual printer 105 and has not previously registered the printer 140. In this case, the printers 110 and 130 are the only printers displayed in the printer selection item 1801. Here, in a case where another printer is selected (e.g., in a case where the printer 110 has been selected as an initial setting but is changed to the printer 130 in the re-configuration screen 1800), the print conversion utility displays information on each print setting of the changed printer. Information on the print settings of each printer type may be held in the storage component of the print conversion utility in advance, or obtained via communication with the printer and held.

Figure 19:
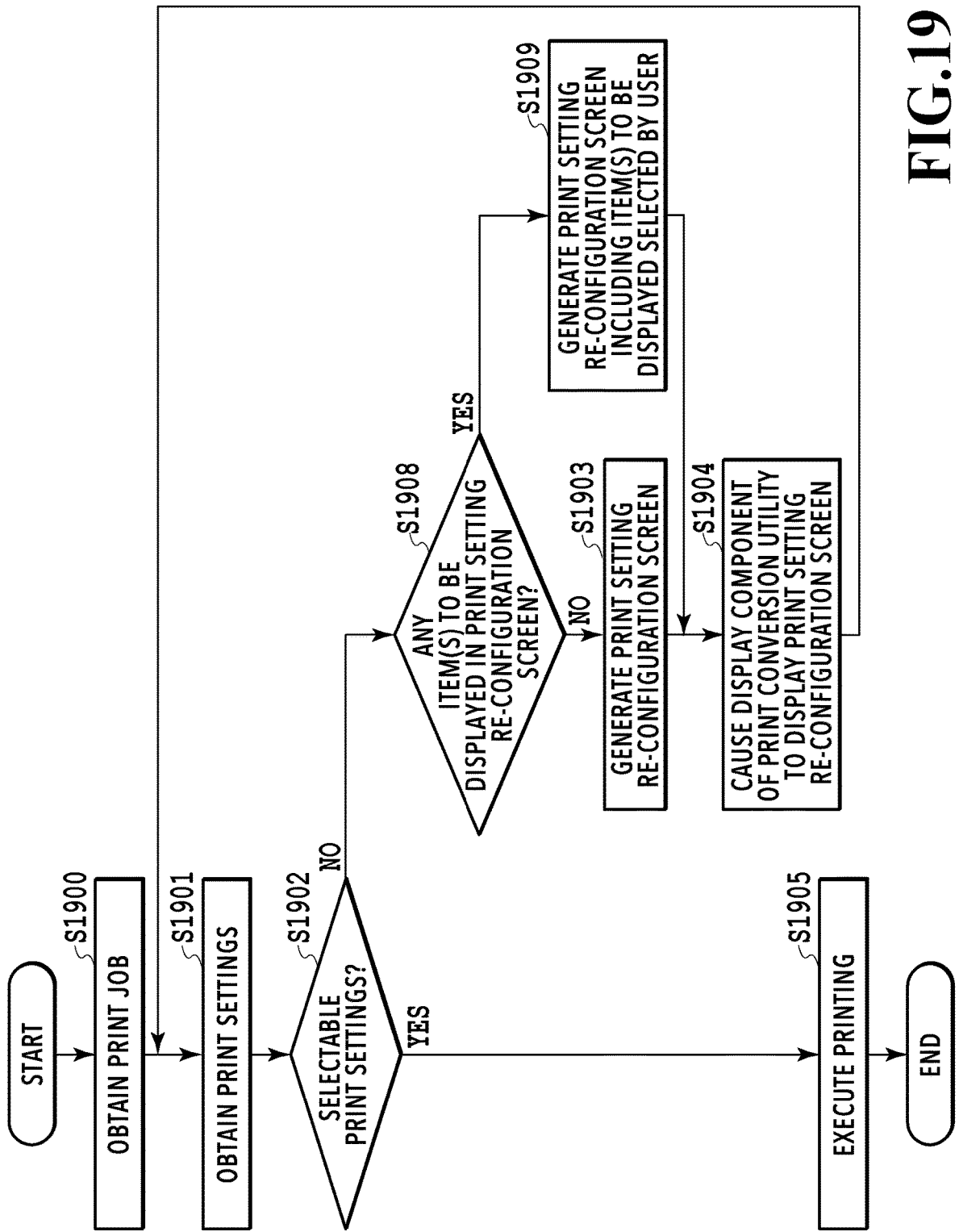
FIG. 19 is a diagram illustrating a flow of a process of displaying the print setting re-configuration screen by the print conversion utility.

FIG. 19 illustrates a flowchart of a process executed by the print conversion utility 106. More specifically, FIG. 19 illustrates a flow of a process in which the printing control component 150 of the print conversion utility 106 changes the method in which the display component 109 of the print conversion utility 106 displays the re-configuration screen 1400 according to the settings in the print display item re-setting screen 1700. Note that the process flow in FIG. 19 starts in a case where the user selects the print button 409 in the print setting screen 400 and the print conversion utility 106 obtains a print job. Note that S1900 to S1901 and S1903 to S1905 in FIG. 19 are similar to S1500 to S1501 and S1503 to S1505 described in FIG. 15 in Embodiment 4, and description thereof is therefore omitted.

In the present embodiment, if determining in S1902 in FIG. 19 that the combination of setting values selected as print settings by the user is not usable, the print conversion utility 106 proceeds to S1908. In S1908, the print conversion utility 106 determines whether there is an item(s) selected as an item(s) desired to be displayed in the re-configuration screen. Specifically, the print conversion utility 106 determines whether at least one of the print preview display setting 1701 or the detail item display setting 1702 is selected in the print display item re-setting screen 1700. If the print preview display setting 1701 or the detail item display setting 1702 is selected in the print display item re-setting screen 1700, the print conversion utility 106 proceeds to S1909 and, otherwise, proceeds to S1903.

In S1909, the print conversion utility 106 generates the re-configuration screen 1800 based on the selection in the print display item re-setting screen 1700 and proceeds to S1904, in which the display component 109 of the print conversion utility 106 is caused to display the re-configuration screen 1800. If determining in S1902 that printing can be performed with the re-set contents, the print conversion utility 106 proceeds to S1905. In S1905, the print conversion utility 106 converts the print data 700 obtained in S1900 into print data compatible with the protocol specific to the printer 130, sends the converted print data to the printer, and terminates the process.

In this way, the user can configure detailed print settings in addition to print settings that need to be changed. This improves convenience. Incidentally, in the re-configuration screen 1800, a print setting which cannot be configured in the print setting screen 400 provided by the OS-standard printing function may be displayed according to the printer's function. For example, in a case where the printer is capable of using a special ink, a setting associated with the special ink may be displayed in the re-configuration screen 1800, and an input may be received from the user. Thus, with the display component 109 of the print conversion utility 106, the user can configure print settings that cannot be configured with the OS-standard printing function. Also, the display component 109 of the print conversion utility 106 may be caused to always display a re-configuration screen including all setting items configurable with the printer in a case of executing printing, irrespective of the determination result in S1902. Moreover, the configuration may be such that whether to always display a re-configuration screen to the user or to display a re-configuration screen only in the case of an unusable combination of setting values can be set with the print conversion utility 106.

As described above, in the present embodiment, a re-configuration screen is displayed based on an item(s) to be displayed in the re-configuration screen selected by the user. In this way, the user can configure print settings necessary for the user or check a print preview. This improves convenience.

Embodiment 7

Next, Embodiment 7 will be described. Embodiments 4 to 6 assume that the print conversion utility 106 is present inside the same PC as the PC which executes printing. In Embodiment 7, printing is performed with a printer from a PC other than the PC 100, in which the print conversion utility 106 is launched, via the print conversion utility 106.

In the following description, descriptions common to those in Embodiments 1 to 6 are omitted, and only the difference will be described. In particular, in the following, a flow of a process via the print conversion utility 106 from a PC other than the one in which the print conversion utility 106 is launched will be described as the difference from Embodiments 1 to 6.

Figure 20:
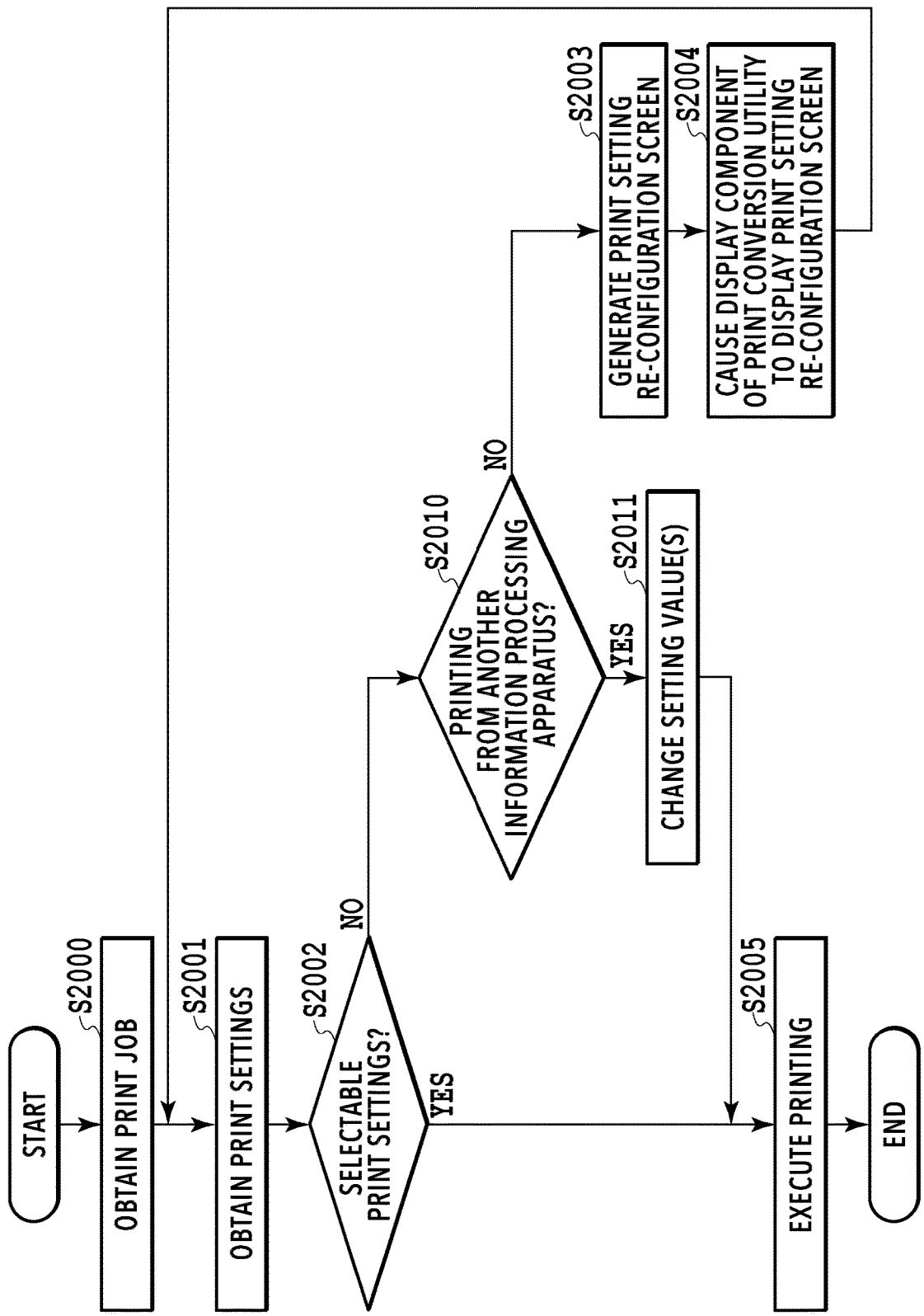
FIG. 20 is a diagram illustrating a flow of a process of displaying the print setting re-configuration screen by the print conversion utility.

FIG. 20 illustrates a flowchart of a process executed by the print conversion utility 106. More specifically, FIG. 20 illustrates a flow of a process in which the printing control component 150 of the print conversion utility 106 changes the method in which the display component 109 of the print conversion utility 106 displays the re-configuration screen 1400 according to the PC that has sent a print instruction. Note that the process flow in FIG. 20 starts in a case where the user selects the print button 409 in the print setting screen 400 and the print conversion utility 106 obtains a print job. S2000 and S2003 to S2005 in FIG. 20 are similar to S1500 and S1503 to S1505 described in FIG. 15 in Embodiment 4, and description thereof is therefore omitted.

In the present embodiment, in FIG. 20, the print conversion utility 106 obtains the address information 701 on the PC which has sent the print instruction from the print data 700 in S2001. Then, if determining in S2002 that the combination of setting values selected as the print settings by the user is not usable, the print conversion utility 106 proceeds to S2010. In S2010, the print conversion utility 106 refers to the address information 701 obtained in S2001 and determines whether the PC 100, in which the print conversion utility 106 is launched, and the PC which has sent the print instruction are different PCs. If determining in S2010 that they are different PCs, the print conversion utility 106 proceeds to S2011 and, otherwise, proceeds to S2003. In S2011, the print conversion utility 106 changes a setting value(s) selected by the user and proceeds to S2005. For example, in a case where "disc" size and "duplex printing" have been set by the user, the print conversion utility 106 changes the duplex printing setting and proceeds to S2005. In S2005, the print conversion utility 106 converts the print data 700 obtained in S2000 into print data compatible with the protocol specific to the printer 130, sends the converted print data to the printer, and terminates the process.

In this way, in the case of executing printing from the PC 120, in which the print conversion utility 106 is not launched, via the print conversion utility 106, the user can start the printing without stopping the printing. This improves convenience.

Other Embodiments

The printing systems in Embodiments 1 to 7 employ a configuration in which the PCs and the printers are connected via particular bi-directional interfaces, but are not limited to this example. Specifically, the printing systems may each be an integrated printing system in which the functions of the PCs and the printers are integrated.

Also, the above-described embodiments may be combined as appropriate. For example, by combining Embodiments 1 and 4, it is possible to display a usage-related guide dialogue in a case of a combination of print settings with which printing can be executed, and display a re-configuration screen in a case of a combination of print settings with which printing is impossible.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-006286, filed Jan. 19, 2021, which is hereby incorporated by reference herein in its entirety.

What is claimed is:

1. An information processing apparatus having printing control software capable of generating print data of a first format, and being capable of communicating with a printing apparatus, the information processing apparatus comprising:
a first obtaining unit configured to obtain print data of a second format containing print setting information from OS-standard printing software which runs in the information processing apparatus, the second format being different from the first format;
a second obtaining unit configured to obtain a settable list; and
a display control unit configured to display a predetermined screen in a case where the print setting information contained in the print data meets a predetermined condition,
wherein a screen containing information on usage is displayed as the predetermined screen in a case where the predetermined condition is that a particular print setting is contained in the print setting information and information as an indication to display the predetermined screen is contained in an item in the settable list corresponding to the particular print setting and the predetermined condition is met.

2. The information processing apparatus according to claim 1, wherein the information processing apparatus has a display unit, and
the display control unit displays the predetermined screen on the display unit.

3. The information processing apparatus according to claim 1, further comprising
a conversion unit configured to convert the print data of the second format into the print data of the first format,
wherein the print data of the first format converted by the conversion unit is sent to the printing apparatus.

4. An information processing apparatus having printing control software capable of generating print data of a first format, and being capable of communicating with a printing apparatus, the information processing apparatus comprising:
a first obtaining unit configured to obtain print data of a second format containing print setting information from OS-standard printing software which runs in the information processing apparatus, the second format being different from the first format; and
a display control unit configured to display a predetermined screen in a case where the print setting information contained in the print data meets a predetermined condition,
wherein the printing apparatus has a display unit, and
in a case of receiving a print instruction from OS-standard printing software running in another information processing apparatus different from the information processing apparatus, the display control unit sends the other information processing apparatus a notification as a prompt to check the predetermined screen on the display unit of the printing apparatus.

5. The information processing apparatus according to claim 4, wherein the notification as a prompt to check the predetermined screen is sent in accordance with a protocol of the OS-standard printing software.

6. An information processing apparatus having printing control software capable of generating print data of a first format, and being capable of communicating with a printing apparatus, the information processing apparatus comprising:
a first obtaining unit configured to obtain print data of a second format containing print setting information from OS-standard printing software which runs in the information processing apparatus, the second format being different from the first format,
a display control unit configured to display a predetermined screen in a case where the print setting information contained in the print data meets a predetermined condition; and
a determination unit configured to determine whether printing is executable based on the print setting information contained in the print data,
wherein the predetermined screen is displayed in a case where the predetermined condition is that the determination unit determines that the printing is not executable and the predetermined condition is met.

7. The information processing apparatus according to claim 6, wherein the predetermined screen is a notification screen that prompts a user to re-configure the print setting.

8. A non-transitory computer readable storage medium storing a program of printing control software which is capable of running in an information processing apparatus and generating print data of a first format, and causes a computer to execute:

obtaining print data of a second format containing print setting information from OS-standard printing software which runs in the information processing apparatus, the second format being different from the first format;

obtaining a settable list; and displaying a predetermined screen in a case where the print setting information contained in the print data meets a predetermined condition, wherein a screen containing information on usage is displayed as the predetermined screen in a case where the predetermined condition is that a particular print setting is contained in the print setting information and information as an indication to display the predetermined screen is contained in an item in the settable list corresponding to the particular print setting and the predetermined condition is met.

9. The storage medium according to claim 8, wherein the information processing apparatus has a display unit, and the displaying includes displaying the predetermined screen on the display unit of the information processing apparatus.

10. The storage medium according to claim 8, further comprising causing the computer to execute converting the print data of the second format into the print data of the first format, wherein the print data of the first format is sent to a printing apparatus from the information processing apparatus.

11. A non-transitory computer readable storage medium storing a program of printing control software which is capable of running in an information processing apparatus and generating print data of a first format, and causes a computer to execute:

obtaining print data of a second format containing print setting information from OS-standard printing software which runs in the information processing apparatus, the second format being different from the first format; and displaying a predetermined screen in a case where the print setting information contained in the print data meets a predetermined condition, wherein the printing apparatus has a display unit, and the displaying includes, in a case of receiving a print instruction from OS-standard printing software running in another information processing apparatus different from the information processing apparatus, sending the other information processing apparatus a notification as a prompt to check the predetermined screen on the display unit of the printing apparatus.

12. The storage medium according to claim 11, wherein the notification as a prompt to check the predetermined screen is sent in accordance with a protocol of the OS-standard printing software.

13. A non-transitory computer readable storage medium storing a program of printing control software which is capable of running in an information processing apparatus and generating print data of a first format, and causes a computer to execute:

obtaining print data of a second format containing print setting information from OS-standard printing software which runs in the information processing apparatus, the second format being different from the first format;

displaying a predetermined screen in a case where the print setting information contained in the print data meets a predetermined condition; and causing the computer to execute determining whether printing is executable based on the print setting information contained in the print data, wherein the predetermined screen is displayed in a case where the predetermined condition is that it is determined that the printing is not executable and the predetermined condition is met.

14. The storage medium according to claim 13, wherein the predetermined screen is a notification screen that prompts a user to re-configure the print setting.

15. A method of controlling an information processing apparatus having printing control software capable of generating print data of a first format, and being capable of communicating with a printing apparatus, the method comprising:

obtaining print data of a second format containing print setting information from OS-standard printing software which runs in the information processing apparatus, the second format being different from the first format;

obtaining a settable list; and displaying a predetermined screen in a case where the print setting information contained in the print data meets a predetermined condition, wherein a screen containing information on usage is displayed as the predetermined screen in a case where the predetermined condition is that a particular print setting is contained in the print setting information and information as an indication to display the predetermined screen is contained in an item in the settable list corresponding to the particular print setting and the predetermined condition is met.

\* \* \* \* \*